United States Patent
Van Wiemeersch et al.

(10) Patent No.: US 9,255,810 B2
(45) Date of Patent: Feb. 9, 2016

(54) VEHICLE CONTENTS INVENTORY SYSTEM INTERFACE

(71) Applicant: FORD GLOBAL TECHNOLOGIES, LLC, Dearborn, MI (US)

(72) Inventors: John Robert Van Wiemeersch, Novi, MI (US); Thomas Joseph Hermann, Troy, MI (US); Robert Bruce Kleve, Ann Arbor, MI (US); Patrick Kevin Holub, Novi, MI (US); Michael Hrecznyj, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 45 days.

(21) Appl. No.: 14/151,299

(22) Filed: Jan. 9, 2014

(65) Prior Publication Data
US 2015/0192423 A1 Jul. 9, 2015

(51) Int. Cl.
*H04B 7/00* (2006.01)
*G06Q 10/06* (2012.01)
(Continued)

(52) U.S. Cl.
CPC ............ *G01C 21/36* (2013.01); *G06F 3/04817* (2013.01); *G06F 21/44* (2013.01); *G06K 7/10089* (2013.01); *G06K 7/10099* (2013.01); *G06K 7/10108* (2013.01); *G06K 7/10316* (2013.01); *G06K 7/10336* (2013.01);
(Continued)

(58) Field of Classification Search
CPC ...... H04B 7/00; H04B 5/0031; H04B 5/0062; H04B 5/0056; G06Q 10/0631; G06Q 10/063; G06Q 10/06; G06K 7/10099; G06K 7/10089; G06K 7/10108; G06K 7/10316; G06K 7/10336; G06K 7/10366; G06K 7/10376; G06K 7/10386; G06K 7/10405; G01C 21/36; G06F 3/04817; G06F 21/44
USPC ................. 701/408, 516, 579, 538, 540, 300; 455/41.2, 500; 705/28, 29; 340/5.92, 340/10.1, 572.1, 572.4
See application file for complete search history.

(56) References Cited

U.S. PATENT DOCUMENTS 6,331,817 B1   12/2001   Goldberg
7,123,149 B2   10/2006   Nowak et al.
(Continued)

FOREIGN PATENT DOCUMENTS

CN   101719304 A   6/2010
EP      1976433 B1  10/2008
(Continued)

OTHER PUBLICATIONS

Wang et al., Finder—RFID Locator: Key Control, Nov. 3, 2011, retrieved from http://www.yankodesign.com/2011/11/03/key-control/, 22 pages.
(Continued)

*Primary Examiner* — Russell Frejd
(74) *Attorney, Agent, or Firm* — Frank MacKenzie; Brooks Kushman P.C.

(57) ABSTRACT

A vehicle inventory interface system may include a user interface configured to present a plurality of vehicle icons each representing a vehicle in a fleet, present at least one list icon associated with each vehicle icon, receive a selection of one of the list icons, and display, in response to the selection, an inventory list associated with the selected list icon and indicating whether items specified by the inventory list are present within the vehicle.

14 Claims, 17 Drawing Sheets

(51) Int. Cl.
 *G06K 7/10* (2006.01)
 *G01C 21/36* (2006.01)
 *G06F 21/44* (2013.01)
 *G06F 3/0481* (2013.01)
 *H04B 5/00* (2006.01)

(52) U.S. Cl.
 CPC ........ *G06K7/10366* (2013.01); *G06K 7/10376* (2013.01); *G06K 7/10386* (2013.01); *G06K 7/10405* (2013.01); *G06Q 10/06* (2013.01); *G06Q 10/063* (2013.01); *G06Q 10/0631* (2013.01); *H04B 5/0031* (2013.01); *H04B 5/0056* (2013.01); *H04B 5/0062* (2013.01); *H04B 7/00* (2013.01)

(56) References Cited

U.S. PATENT DOCUMENTS

| | | | |
|---|---|---|---|
| 7,138,916 | B2 | 11/2006 | Schwartz et al. |
| 7,151,454 | B2 | 12/2006 | Washington |
| 7,176,801 | B2 | 2/2007 | Matsukawa et al. |
| 7,209,041 | B2 | 4/2007 | Hines et al. |
| 7,474,213 | B2 | 1/2009 | Tsuboi |
| 7,489,242 | B2 | 2/2009 | Hines et al. |
| 8,193,923 | B2 | 6/2012 | Rork et al. |
| 8,193,924 | B2 | 6/2012 | Rork et al. |
| 8,334,766 | B2 | 12/2012 | Teran-Matus et al. |
| 8,427,292 | B2 | 4/2013 | Rork et al. |
| 8,847,754 | B2 | 9/2014 | Buchheim et al. |
| 2002/0113706 | A1 | 8/2002 | Prado et al. |
| 2003/0102970 | A1 | 6/2003 | Creel et al. |
| 2004/0217864 | A1 | 11/2004 | Nowak et al. |
| 2005/0052281 | A1 | 3/2005 | Bann |
| 2005/0110639 | A1 | 5/2005 | Puzio et al. |
| 2005/0242971 | A1 | 11/2005 | Dryer |
| 2006/0139159 | A1 | 6/2006 | Lee et al. |
| 2006/0193262 | A1 | 8/2006 | McSheffrey et al. |
| 2006/0255916 | A1 | 11/2006 | Cox |
| 2007/0109096 | A1 | 5/2007 | Breedlove |
| 2008/0228346 | A1 | 9/2008 | Lucas et al. |
| 2010/0250309 | A1 | 9/2010 | Pleet et al. |
| 2011/0148625 | A1 | 6/2011 | Velusamy |
| 2012/0154174 | A1 | 6/2012 | Schunder |
| 2012/0223145 | A1 | 9/2012 | Stewart et al. |
| 2013/0062418 | A1 | 3/2013 | Weakley |
| 2014/0055243 | A1 | 2/2014 | Kerai |

FOREIGN PATENT DOCUMENTS

| | | |
|---|---|---|
| KR | 100754548 B1 | 9/2007 |
| WO | 2009073255 A1 | 6/2009 |

OTHER PUBLICATIONS

DPL Surveillance Equipment, Personal (RFID-Based) Tracker / Locator, retrieved from http://www.dpl-surveillance-equipment.com/1000066086.html, 5 pages.

IP.Com Disclosure No. IPCOM000228069D, System and Method to Alert on Items Left in a Rental Car, Jun. 4, 2013, <https://priorartip.com/IPCOM/000228069>, 1 page.

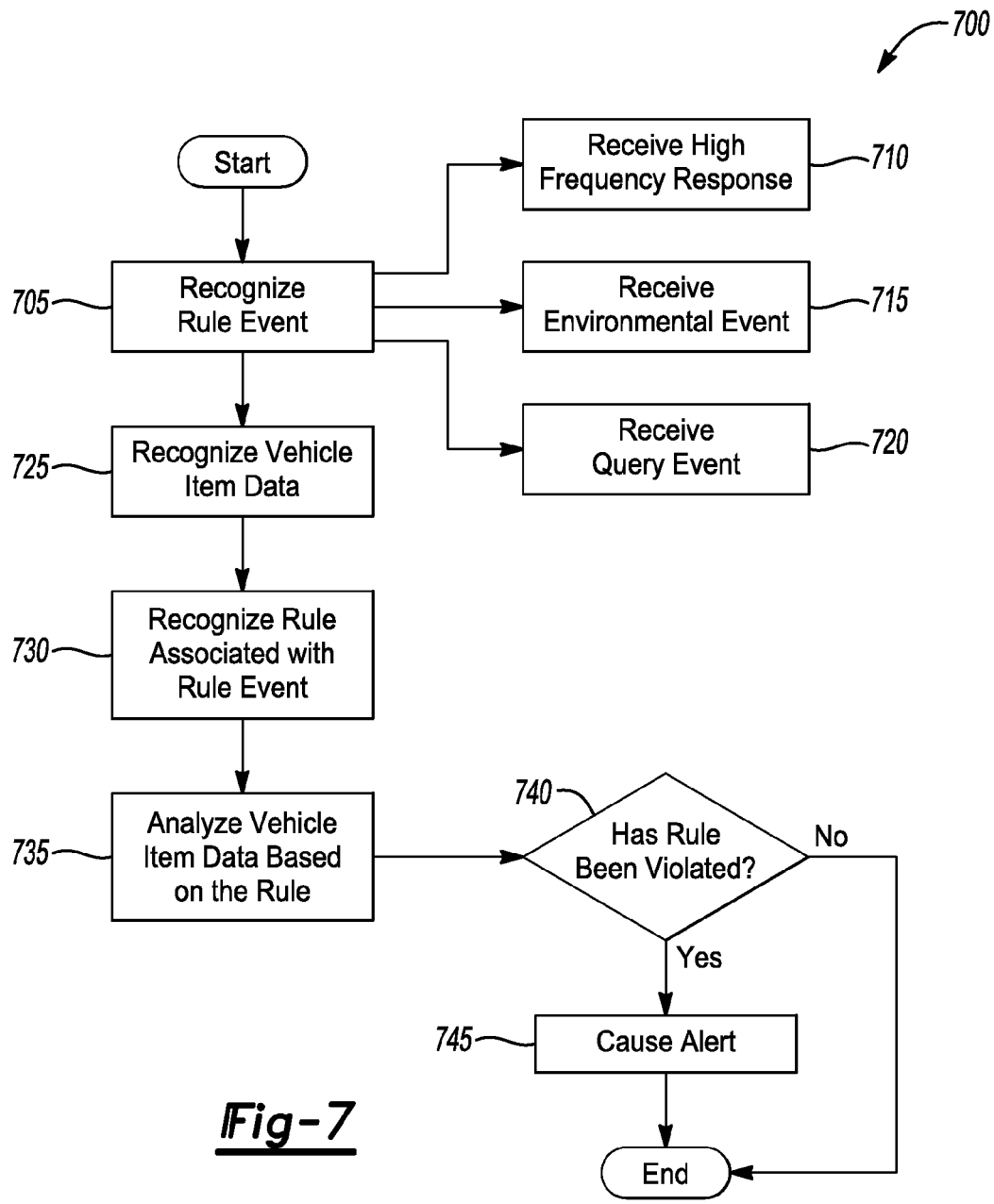

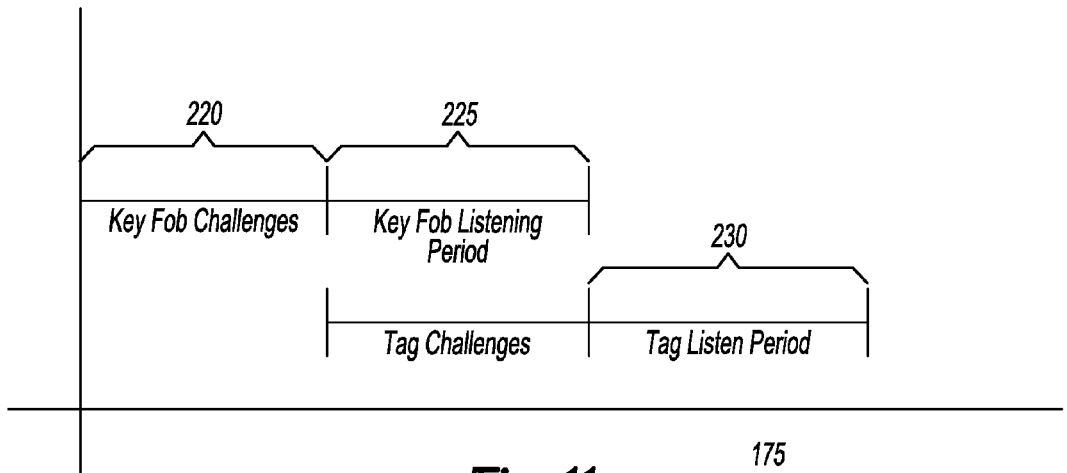
*Fig-11*
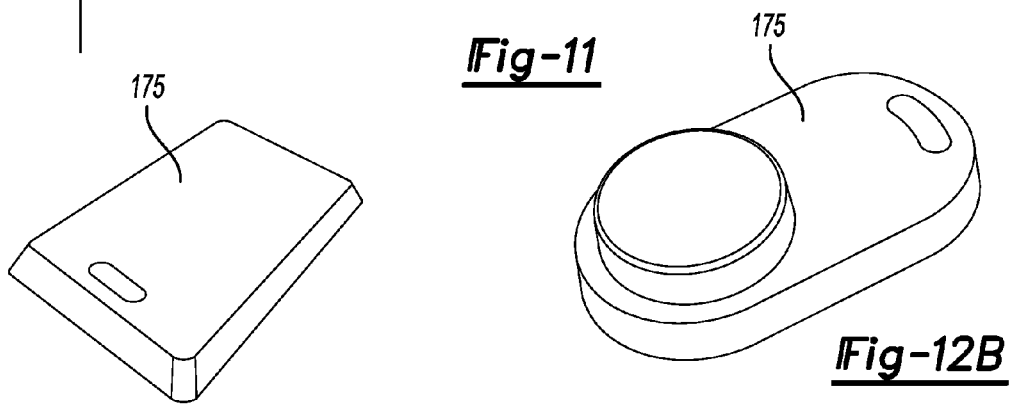
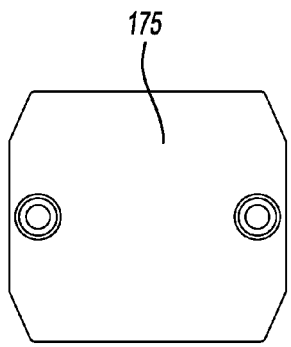
*Fig-12A*
*Fig-12B*
*Fig-12C*
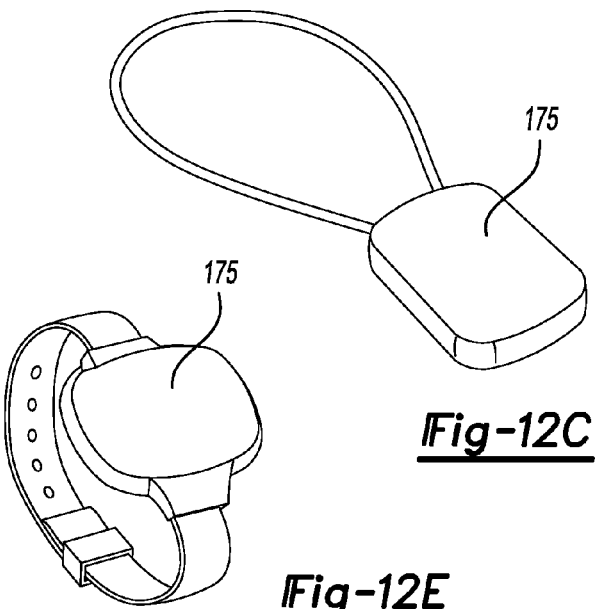
*Fig-12D*
*Fig-12E*

VEHICLE CONTENTS INVENTORY SYSTEM INTERFACE

TECHNICAL FIELD

The present disclosure relates to a vehicle contents inventory system interface.

BACKGROUND

In order to reduce loss and increase efficiency, businesses often attempt to track their moveable inventory such as equipment, tools, etc., from vehicle to vehicle. That is, determining which tools are within a vehicle may ensure that the vehicle is properly equipped as well as help prevent loss and increase accountability of the responsible person. Families, sport coaches, and self-employed individuals may also track their belongings to improve the quality of their daily activities.

SUMMARY

A vehicle inventory interface system may include a user interface arrangement configured to present a plurality of vehicle icons each representing a vehicle in a fleet, present at least one list icon associated with each of the vehicle icons, receive a selection of one of the list icons, and display, in response to the selection, an inventory list associated with the selected list icon and indicating whether items specified by the inventory list are present within the vehicle.

A vehicle inventory interface system may include a passive entry system configured to authenticate a key fob in a vicinity of the vehicle and to cause an interface to present a plurality of points of interest and driving routes defined there between, and an indication of a current route based on a vehicle location, present an inventory list icon for each driving route, receive a selection of one of the inventory list icons, and display an inventory list associated with the selected list icon and indicating whether items specified by the inventory list are present within the vehicle.

An interface system may include a passive entry system including at least one controller configured to authenticate a key fob in a vicinity of the vehicle and to cause an interface to present a plurality of points of interest and driving routes defined there between, present a rule icon associated with each driving route, receive a selection of the rule icon, and present, in response to the selection, a rule list including a list of items corresponding to the driving route associated with the rule icon selected and at least one option block for modifying the rule list in response to user selections.

BRIEF DESCRIPTION OF THE DRAWINGS

FIG. 7 is a process flow for applying rules of the inventory system.

FIG. 11 shows intervals for challenging key fobs and receiving high frequency responses for the inventory system;
FIGS. 12A through 12M show tag configurations.

DETAILED DESCRIPTION

Described herein is a vehicle inventory system for tracking items within a vehicle or attached to exterior surfaces and cargo holders of a vehicle. By transmitting low frequency challenges from one or more antennas within the vehicle, a passive or active radio frequency identification tag may respond with a high frequency response, identifying the tag and thus indicating that the item associated with the tag is present in the vehicle or attached to exterior surfaces and cargo holders within range of the low frequency antennas. The components of existing passive entry/passive start (PEPS) systems may be used to facilitate this inventory system and no undue aftermarket solutions may be necessary to effectively track tagged items. Moreover, additional equipment may be added on an aftermarket basis (e.g., adding an additional antenna to the roof.)

Figure 1:
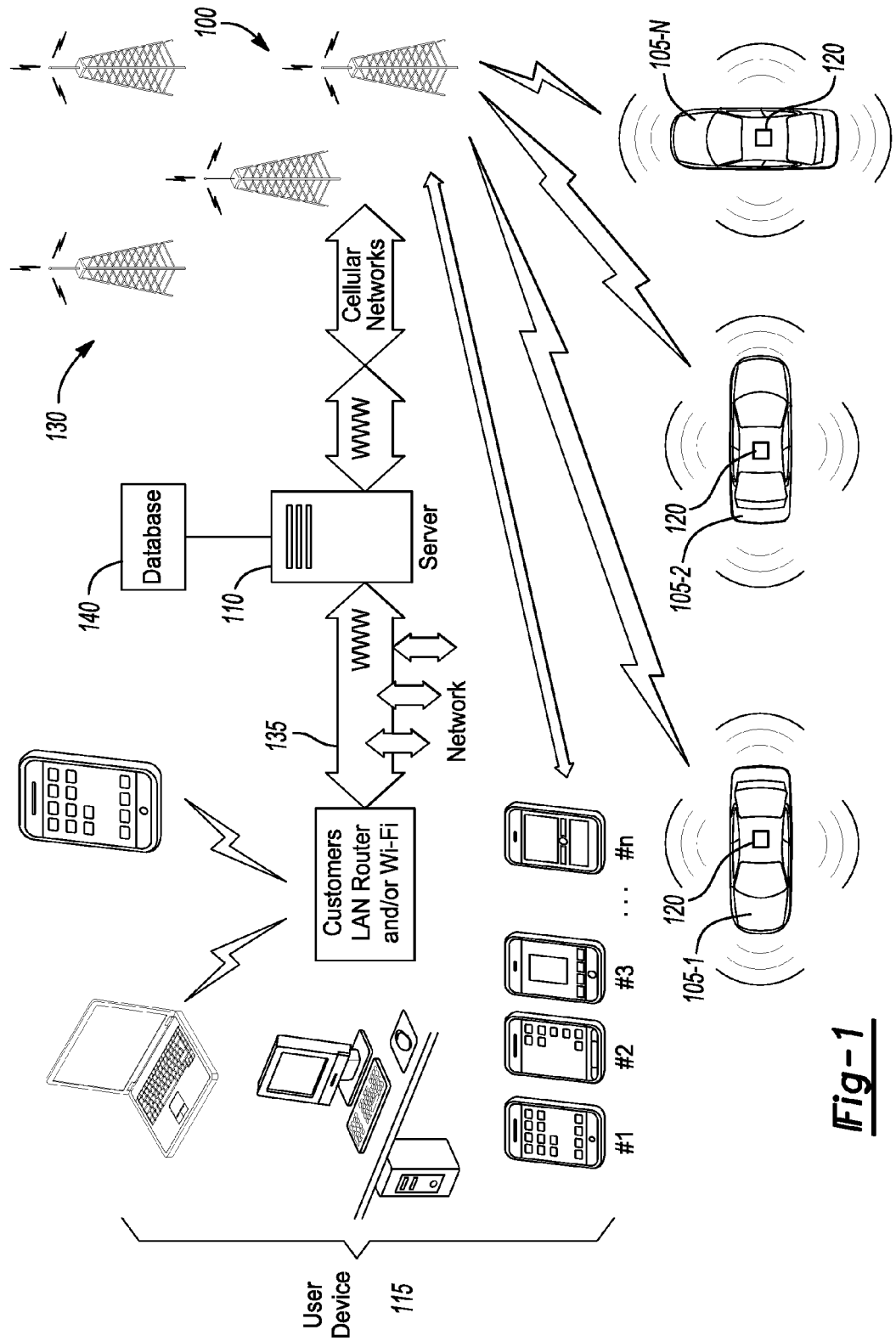
FIG. 1 is a vehicle inventory system.
Figure 2:
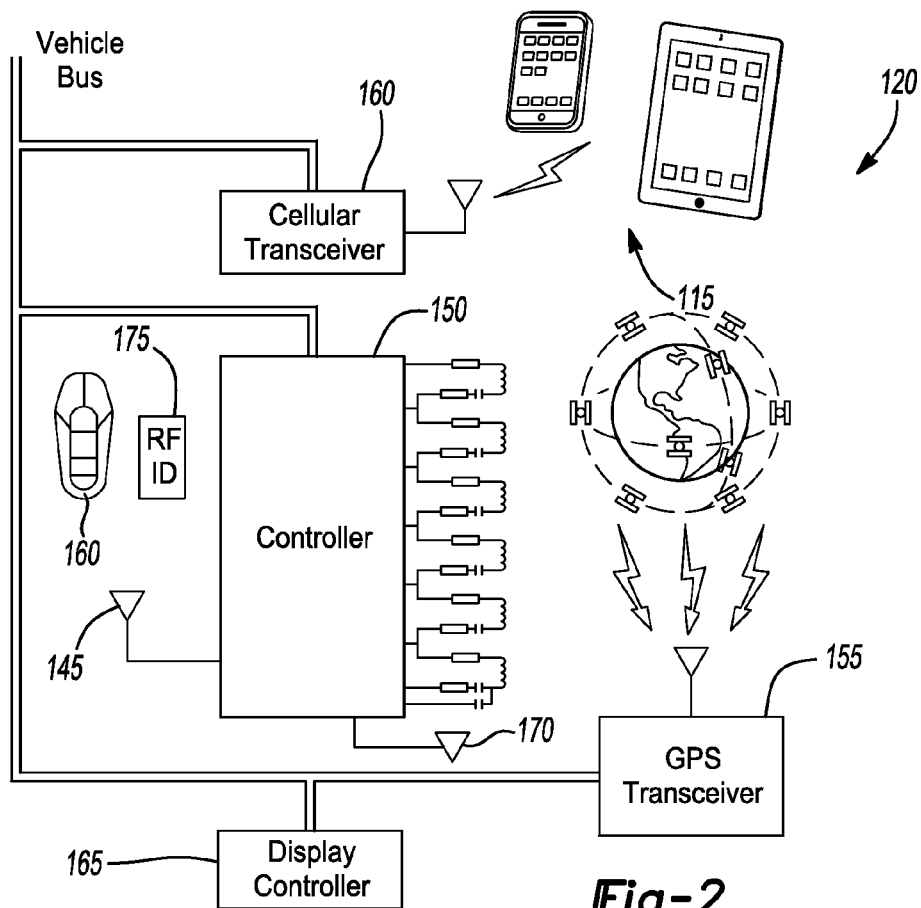
FIG. 2 is a schematic for an onboard vehicle system.

FIG. 1 shows an exemplary vehicle inventory system 100 including a vehicle 105, a system server 110, and a user device 115. Not shown in FIG. 1, but discussed with respect to FIG. 2 is a plurality of first vehicle antennas 170, a second vehicle antenna 145, and item tag 175. The item tag 175 is a device associated with an item, usually attached thereto, that includes a transponder capable of receiving low frequency challenges from the antennas 170. The tag 175 may be configured to return a high frequency response identifying the tag via a radio frequency identification (RFID), which may be received by second antenna 145. In some close proximity situations (e.g., less than a few inches), the antennas 170 may be used to send low frequency challenges to the radio identification (RFID) and the tag may respond back with a low frequency response to the same antennas 170 which would be acting as a transceiver antenna. This is typically done when the tag has lost battery power. The system 100 may use the response to identify the object and thus track the inventory of a vehicle 105.

The vehicle 105 may include a vehicle module 120 configured to communicate with the system management server 110 via a cellular network 130. The system management server 110 may also communicate with the user device 115 via the cellular network 130 and/or another wireless network 135, such as Wi-Fi, Bluetooth, Local Area Network (LAN), etc.

The vehicle 105 may be any type of vehicle. It may be a motor vehicle, as indicated by way of example in the figures. It may be another type of mobile machine configured to carry passengers such as a bus, motorcycle, train, ship, boat or aircraft. It may also be a cargo or storage container. The vehicle 105 may be capable of carrying certain items such as personal items, machinery, tools, medical equipment, etc. The items may be associated with a passive tag configured to transmit a radio frequency identification (RFID) to the vehicle antenna 145, as discussed below with respect to FIGS. 2 and 3. As shown in FIG. 1, multiple vehicles 105-1, 105-2, 105-n may enable item tracking. These vehicles may all be associated with one another via a relationship such as a familial relationship, employer relationship, travel caravan or convoy, etc.

Figure 3A:
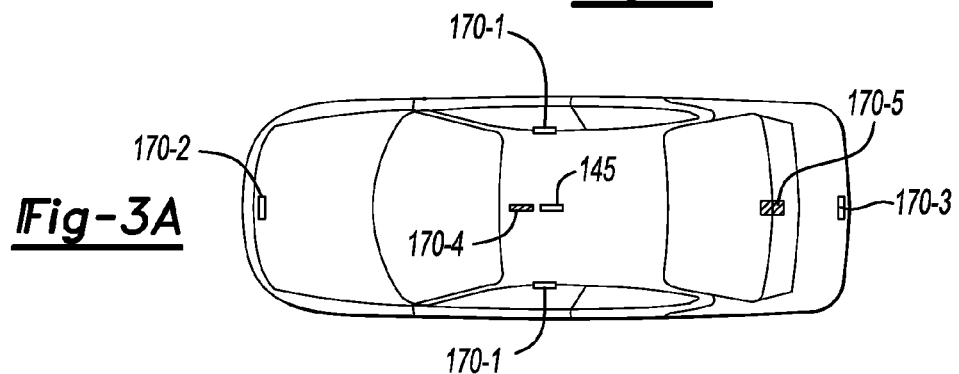
FIGS. 3A and 3B show a vehicle having a plurality of antennas.
Figure 3B:
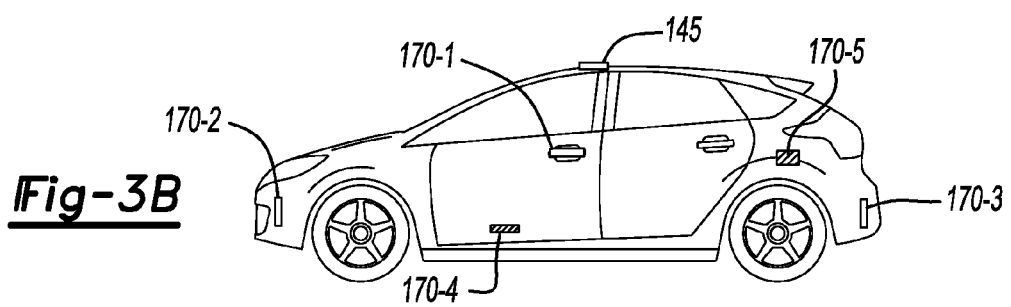

The vehicle module 120 may be a module within the vehicle 105 and may be configured to receive signals from various antennas 145, 170 within the vehicle 105 (as shown in FIGS. 3A and 3B.) These signals may identify the tags present within or near the vehicle 105 so as to track the items associated with the tags. The vehicle module 120 is described in more detail below with respect to FIG. 2.

The system management server 110 may be a server configured to facilitate communication between the authorized user devices 115 and the module 120. The server 110 may be an automated call server facilitating a web host to perform the communication between the vehicle 105 and the authorized user device 115. In one example, the module 120 may communicate with the server 110 via the cellular network 130. The module 120 may transmit a message indicating that certain items are located within the vehicle 105, as recognized by the antennas 145, 170. The system management server 110 may authenticate the vehicle 105 by recognizing a vehicle identification number transmitted with the message.

The module 120 may instruct at least one antenna 170 (as shown in FIG. 3) to transmit a low frequency challenge. A tag 175 may be adhered or attached to an item within the vehicle. This tag 175 may be a special tag made just for tracking and/or it may be the factory standard vehicle key fob having passive entry/passive start (PEPS) capabilities. The tag 175 may also be part of systems known as Keyless Access System, Advance Key, Comfort Access, Enter-N-G™, Intelligent Access, Smart Entry, SmartKeys, Intelligent Key®, SmartPass, Kessy, for example. Exemplary configurations of the tag 175 are shown in FIGS. 12 and 13 and discussed below. The tag 175 may communicate with the vehicle 105 via low frequency and/or ultra high frequency communication protocols, including challenges and responses, between the tag 175 and the vehicle module 120. The tag 175 may include a transponder configured to operate as a radio-frequency identification (RFID) tag used to identify the tag 175, and thus, identify the item. That is, when the antennas 145, 170 receive an ultra high frequency response from a tag 175, the module 120 may determine that the item associated with that tag 175 is within or near the vehicle 105. The module 120 may then transmit a message to the server 110 to facilitate inventory tracking with other vehicles within the authorized user system. The tag 175 may be a passive tag, keeping costs to a minimum, or it may be an active tag. Further, the tag 175, being of the same form as common PEPS tags used today, may be considered safe for use in the passenger compartment of a vehicle 105. That is, it is safe for humans and animals to be in close proximity to the transmitter antennas 170 and the ultra high frequency transmitted by the tags. For exemplary purposes only, low frequency challenges may be transmitted below 200 kHz and may be transmitted at frequencies of 20 kHz, 125 kHz, and 134.5 kHz, for example. The high frequency responses may be transmitted above 200 MHz and may be transmitted at frequencies of 314 MHz, 433 MHz, 434 MHz, 868 MHz, and 903 MHz, for example.

Both tags 175 and a traditional key fob 160 may communicate with the antennas 145, 170. As stated, existing PEPS key fobs may be used as tags 175. By using existing key fobs, additional costs are avoided because broad spectrum transmitters and receivers are not necessary. Costs are also avoided because additional cabin antennas 145, 170 may not be necessary. Further, existing key fobs have power levels that are safe for passengers and other vehicle systems. Key fobs with a received signal strength indicator (RSSI) capabilities may be used. When key fobs are used as tags 175, the key fobs may be designated as such within the inventory system 100. For example, while the first and second keys (keys #1 and #2) are used as traditional key fobs 160 to gain access or to start a vehicle 105, the third and fourth dealer issued key fobs (keys #3 and #4) may be designated as inventory tags 175.

The tags 175, as explained, may be associated with various commercial items such as tools, equipment, etc. The tags may also be associated or factory equipped with personal items such as a briefcase, lunchbox, golf clubs, musical instruments etc. In addition to tagging individual items, bundles of items may also be tagged such as camping supplies, tools, groceries, etc. Tags 175 may also be grouped into certain categories. These categories may be user defined at a display interface at either the vehicle module or the user device 115. The categories, as discussed below, may be employed by a user to quickly verify that all necessary items are within a vehicle 105 and those that should not be present are absent. For example, if a user is traveling, the user may wish to verify that all of that user's medical equipment is within the vehicle 105. In this example, tags 175 may be associated with each of the user's insulin kit, oxygen tank, prescription medication, wheelchair etc. These categories are discussed in more detail below.

The server 110, in addition to authenticating the user devices 115 and facilitating communication between user vehicles and vehicle modules 120, may also maintain and store the data received from the vehicle modules 120 in the database 140. That is, the server 110 may catalog the message for later use. The messages may be maintained within the server 110 or within database 140. The messages may indicate the presence of a tag 175 associated with a vehicle. In one example, a tag 175 may be associated with and attached to a gym bag. A message transmitted from vehicle 105-1 to the server 110 may indicate that the tag 175 associated with the gym bag is within the vehicle 105. The server 110 may store this information in the database 140. As described herein, this information may then be used by the user device 115 to determine the location of the gym bag, e.g., which vehicle it is in.

The user device 115 may be a computing device capable of receiving information from the server 110 and/or the vehicle module 120. The user device 115 may be a mobile device such as a mobile phone, tablet computer, laptop computer, personal digital assistant (PDA), smartphone, etc. The user device 115 may also be a desktop computer. The user device 115 may have a user interface configured to display information to the user of the device 115. The interface may be an integrated graphical user interface (GUI). It may be a screen such as a liquid crystal display (LCD), light emitting diode (LED) display, plasma screen, etc. The interface may also be a computer monitor or projector. The user interface may be configured to display information, such as the presence of certain items within a vehicle 105. Exemplary user interfaces are shown in FIGS. 6A-D and 8A-C and may include photos/icons of the items, etc.

The user device 115 may communicate with the server 110 via the wireless network 135. It may also communicate with the vehicle module 120 via cellular network 130, WiFi® or Bluetooth®. By communicating with the server 110 and/or the module 120, the user device 115 may receive information regarding items within a vehicle 105. The user device 115 may be authenticated by the server 110 and/or recognized by the module 120. The device 115 may be associated with more than one vehicle 105 and may receive information about each vehicle's inventory (i.e. items within or on a vehicle 105). This may be advantageous when a single user is managing a fleet of vehicles and would like to monitor the inventory of each. Additionally, one or more user devices may be associated with the same vehicle 105 or multiple vehicles 105. This may be advantageous when multiple users are using multiple vehicles such as in a large family or small business. In another example, a family member may wish to know which items, or which of a specific item, is located within which vehicle 105. The user interface may display this information in several ways such as pictorial representations of the items, a list of items within each vehicle, etc. The module 120 and/or server 110 may permit a user to manage inventory across multiple vehicles by correlating the information regarding the tags 175 across multiple vehicles 105. A user may be able to manage such information from his or her mobile device 115 or from within the center console/display of a vehicle 105.

Networks 130 and 135 may be any type of wireless network such as Wi-Fi, Bluetooth, local area network (LAN), cellular networks, ad-hoc wireless networks (e.g., Zigbee® or Z-Wave), etc. It may also include a combination of wired and wireless protocols. For exemplary purposes only, network 130 is described herein as being a cellular network and network 135 is described herein as being a wireless network such as a LAN or Wi-Fi network.

Referring to FIG. 2, an exemplary vehicle module 120 is shown. The vehicle module 120 may include a function controller 150, a global positioning system (GPS) transceiver 155, a cellular transceiver 160 and display controller 165. The function controller 150 may be a PEPs controller in communication with the GPS transceiver 155, cellular transceiver 160 and the display controller 165. It may also be in communication with a vehicle antenna 145, 170. The antennas 145, 170 may communicate with the tag 175. While the second vehicle antenna 145 may be described herein as an antenna for receiving ultra high frequency responses, and while the first antennas 170 may be described as transmitting low frequency challenges, both may transmit and receive and each may be interchangeable. As explained, the tag 175 may have a transponder configured to receive low frequency challenges from the antennas 170. The antenna 145 may then receive a high frequency response from the tag 175.

The GPS transceiver 155 may communicate with the function controller 150 and a satellite to provide the function controller 150 with location information. This location information may be used by the function controller 150 to determine the location of the vehicle 105. The GPS transceiver 155 may also employ dead reckoning techniques which determine vehicle location in the absence of the ability to see GPS satellites. Dead reckoning may use vehicle gyro sensors typically used by the crash system, to overlap vehicle movements on top of the last known GPS coordinates to make a surrogate map of the vehicles location until sufficient satellites can be seen. This is typically required for regions with tunnels or very tall closely clustered buildings. In the absence of valid GPS transceiver signals, the vehicle system controller may use the cellular transceiver 160 to generate "Assisted GPS" data to determine the vehicle location by triangulating off at least three cellular towers.

The cellular transceiver 160 may be a transceiver configured to communicate with the user device 115 as described above. The cellular transceiver 160 may receive information from the function controller 150 and transmit it to the user device 115. The cellular transceiver 160 may also receive requests from the user device 115. These requests may include requests for information such as inventory information for that specific vehicle 105.

The display controller 165 may be configured to instruct a display within the vehicle 105 to display information to the driver or other occupants via an interface. The display may display information regarding the vehicle inventory. In one example, the display may list the items located within the vehicle 105. In another example, the display may alert the driver as to a missing item. For example, if the driver is traveling to work, the driver may be alerted that his or her brief case is not within the vehicle 105. The display may also show specific routes and rules associated with those routes. For example, if the vehicle 105 is driving from home to the occupant's office, a rule may be implemented to check the vehicle cabin for the occupant's brief case. The display may also provide interfaces for user created rules. The interfaces within the vehicle 105 may be the same or similar to the interfaces displayed on a user device 115. The interfaces are described in more detail below with respect to FIGS. 6A-D and 8A-C.

FIG. 3A and FIG. 3B show exemplary locations for various vehicle antennas 170 within the vehicle 105. The antennas 170 are configured to transmit a low frequency challenge to the tags 175. The tags 175 may then respond with a high frequency signal. The low frequency challenges to the tags may be transmitted based on a call for content or on conclusion of a PEPS ultra-high frequency response to the vehicle that was part of the access or ignition process and not related to a tag inventory action. Standard functional PEPS low frequency challenges may be initiated by keyless entry actions including human actions, such as approaching the vehicle 105, touching the door handle, pushing the STOP/START button, opening a door, etc. The vehicle inventory system 100 may be configured to calculate when the PEPS response time to this challenge has expired or should expire. Once this is determined, a tag low frequency challenge may be transmitted to allow a tag response that does not overlap with the PEPS response. This is described in more detail below with respect to FIGS. 10 and 11.

The antennas 170 may be located at several locations in and on the vehicle 105. As shown in FIG. 3, the antennas may be located in the door handles of the vehicle 105 (e.g., antennas 170-1.) Antennas may also be located in or on the hood or front bumper of the vehicle 105 (e.g., antenna 170-2), the rear of the vehicle (e.g., antenna 170-3), within the center console of the vehicle (e.g., antenna 170-4), and in the rear cabin of the vehicle 105 (e.g., antenna 170-5.) An additional antenna may be included at or near the top of the vehicle (e.g., antenna 145). This additional antenna 145 may be located on the roof of the vehicle 105. Thus, up to seven (7) antennas 145, 170 may be included in the vehicle system 100 (six first antennas 170 and one second antenna 145), although more or less may be included. In one example, where a vehicle is not capable of carrying items on top of the vehicle 105, e.g., the vehicle 105 is a convertible with a soft top, the roof antenna 145 may not be necessary. In another example, if a vehicle 105 is not capable of pulling items behind it, e.g., the vehicle 105 does not have a hitch, the rear antenna 170-3 may not be necessary.

The vehicle antennas may each have a signal strength indicator (SSI) capable of determining the signal strength of a tag response. More than one antenna may receive the tag response and each antenna may use the signal strength of the tag response to determine the location of the tag 175. That is, the higher the signal strength measured by the tag for a specific antenna, the closer the tag 175 is to that antenna 170. This method may be used to determine whether an item is within the vehicle 105 or outside of the vehicle. For example, if an antenna 170-1 on the door handle detects a very high signal strength, but all other antennas either do not receive a tag response, or the signal strength of the response is very low, it may be determined that the item is outside of the vehicle near antenna 170-1. Based on the rules applied by the controller 150 and as described herein, the system 100 may issue an alert to allow a user to realize that the item is not within the vehicle 105.

Figure 4A:
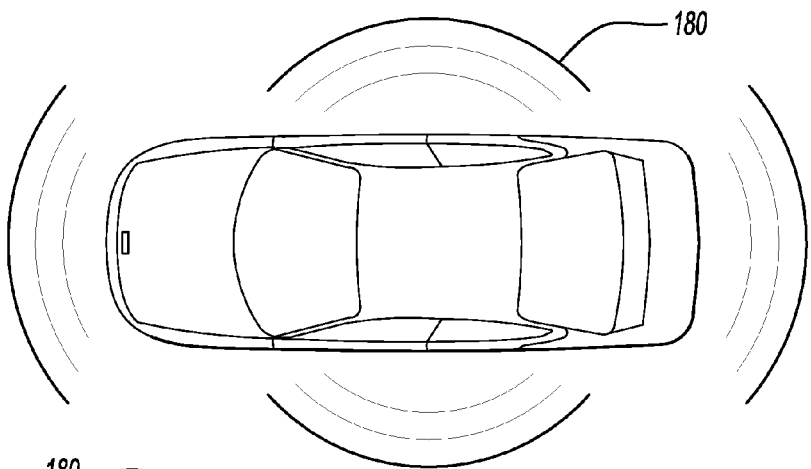
FIGS. 4A through 4C show vehicle zones created by the antennas of FIGS. 3A and 3B.
Figure 4B:
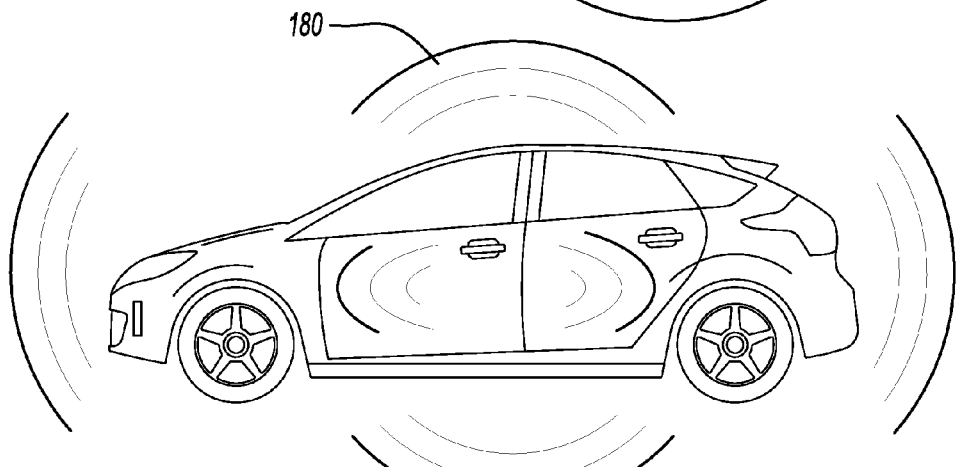
Figure 4C:
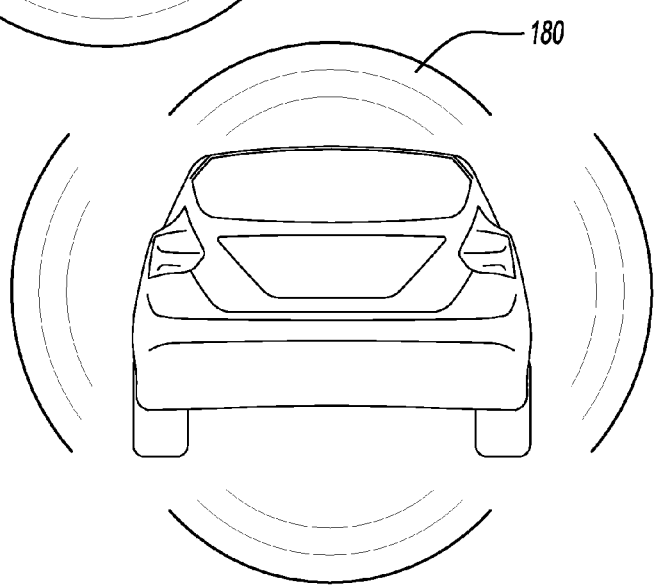

Referring to FIGS. 4A-4C, each antenna 170 may create a low frequency zone 180 around the vehicle 105. The zones 180, created by each of the antennas 170, may have a radius of approximately 1-3 meters from the respective antenna 170. As shown in the figures, the zones 180 may have a circular or oval shape. When a tag 175 enters a zone, the tag's transceiver may detect the challenge transmitted by the respective antenna 170 and may respond back with a designated high frequency response. Each of the zones 180 may detect tags 175 on items within, on, below, or around the vehicle 105. The high frequency response may be received by the function controller 150 and transmitted to the server 110. Usages for monitoring tags below the vehicle may include a tire with a tag secured to the underside of the trunk or rear zone of the vehicle, or a tag embedded in the pavement used to ensure a vehicle has returned to a proper parking spot (such as a rental fleet) since GPS resolution is not adequate nor available in many parking structures. Other potential uses for detecting a tag under the vehicle may be to validate that a moving vehicle that is off is being transported by an authorized method such as a factory vehicle carrier truck and not a tow-truck. There are many other potential uses.

As explained briefly above and illustrated in the Figures, the inventory system 100 may include various rules to help the driver and/or occupants from forgetting various items. The rules may also help ensure that inappropriate items (e.g., firearms) are not in the vehicle 105 at certain locations or while certain persons are in the vehicle 105 (e.g., persons not authorized to carry firearms.) The rules may be user defined in that the driver, occupant, or other users may create the rules in order to facilitate a better user experience with the system 100. In one example, a parent may create a rule such that the inventory system 100 checks that every child has his or her backpack on the way to and from school every day. The parent may instruct the system 100 to alert the driver and occupants if the system 100 determines that a backpack is missing or if the backpack remains after the vehicle has passed or stopped and left the location of the school. A business owner may create a rule that each vehicle 105 should be loaded with appropriate equipment before leaving for a certain job site and may check for the same equipment upon the vehicle's return to help prevent equipment loss. If the equipment is not in the truck that departed with the tagged items, it could then use the server 110 and cloud database 140 to determine if one of the other vehicles in the user group retrieved the tagged item(s) and would be returning the item on behalf of the person who tagged out the item. This ability to look across a group of vehicles for an item tagged by any vehicle may be a useful tool to businesses and/or sport teams by avoiding an unnecessary trip by the vehicle that checked-out the item to return and search for the item.

These rules may be established by a user via the interface, either at the user device 115 and/or vehicle 105. As explained, the server 110 may communicate with the user device 115 and the vehicle module 120 to allow for the system 100 to be managed at several locations, including several vehicles 105 and user devices 115. An exemplary interface is described below with respect to FIGS. 6A-6D but may include graphics associated with various items, maps, lists, etc.

Such rules may also be included in the system 100 as default rules. In one example, certain geographical areas may not permit certain items. For example, school campuses may not permit firearms. The GPS transceiver 155 and the vehicle module 120 may determine that the vehicle is approaching an area that does not permit firearms. The function controller 150 may cause the antenna 170 to emit a low frequency challenge signal. If a high frequency response is received and indicative of an unpermitted item, the controller 150 may instruct the interface to warn the occupants of the vehicle 105. The interface may display a warning screen, may emit an audible warning. Additionally or alternatively, the occupants' user device 115 may also provide the warning.

Figure 5:
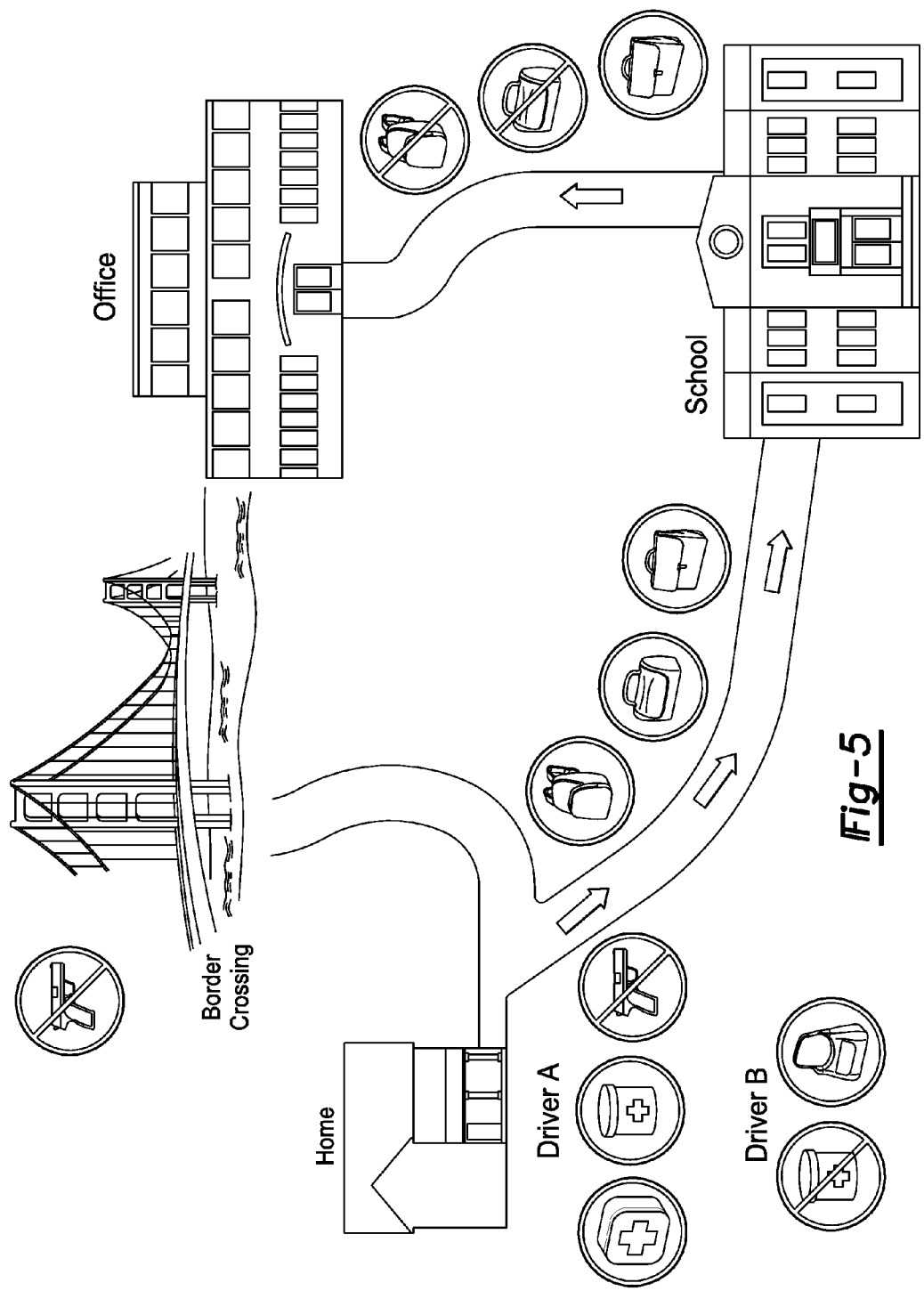
FIG. 5 is a diagram for various rules associated with drivers, routes and locations.

FIG. 5 shows an exemplary map with exemplary rules associated with various drivers and landmarks. That is, the system 100 may maintain driver specific rules, environment specific rules and object specific rules. In one example, each driver may be associated with rules outlining a list of items that should be within the vehicle 105, as well as items that should not be within the vehicle. Such rules may be maintained at either the controller 150 of the vehicle module 120, the server 110, and/or the user device 115. A specific driver may be identified by a key fob 160 associated with the driver, or by their cell phone, or even via biometric means if the vehicle is equipped with such systems (e.g., fingerprint reader, facial recognition, etc.). In the case of the key fob, each driver may have a specific key fob 160 typically used by that driver. Upon using the key fob 160 to unlock or gain access to the vehicle 105, the controller 150 may recognize the key fob 160 and retrieve a list associated with that key fob 160. For example, if a first key fob is associated with driver A and is detected by the controller 150, a first list associated with the first key fob 160 may be retrieved. The antenna 170 may then transmit a low frequency tag challenge and receive one or more high frequency tag responses from one more item tags 175. These responses may indicate the items that are within the vehicle 105. These identified items may be compared with the retrieved list to ensure that all required items are within the vehicle 105, and that no forbidden items are also within the vehicle. In addition to using responses from key fobs 160 to identify drivers, drivers may also be identified by other mechanisms. In one example, a username/password may be inputted at the interface.

In the example shown in FIG. 5, driver A may be associated with a list requiring that the driver's medications such as insulin and other prescription medications are present within the vehicle 105. However, driver A may not be authorized or hold the appropriate permit to carry a firearm. Thus, the system 100 will also verify that no firearms are within the vehicle 105. Driver B may not have a prescription for the medications that driver A usually carries. Thus, the system 100 may verify that while driver B is the only driver in the vehicle 105, the medications are not present. However, driver B may be authorized to carry a firearm, and therefore it is not a forbidden item when driver B is in the vehicle 105. The rule associated with driver B may also include a list of required items, such as a purse.

Along with having driver specific rules, environment specific rules may also be implemented. Environment specific rules may relate to environmental factors such as the location of the vehicle 105 and the route the vehicle 105 is traveling, the time of day, the weather and specifically the temperature inside the vehicle 105, among others. As shown by way of example in FIG. 5, certain rules may be applied to specific routes. For example, on the route from home to school, the rule may require that a backpack, lunch and briefcase be located within the car. However, after an occupant is dropped off at school, the system 100 may take inventory to ensure that the backpack and lunch are not within the vehicle 105 to verify that the occupant did not forget to take these items with him or her. Thus, on the route from the school to an office, only a briefcase is located within the vehicle 105.

Moreover, a certain location may also have rules associated with it. In the example shown, a rule may ensure that no firearms or weapons are present in the vehicle 105 if the vehicle 105 is approaching a border crossing. Such locations, such as a border crossing, may have restrictive laws associated with it. As a vehicle approaches the border crossing, or comes within a predefined radius or region of the restrictive location, the rules may be used to verify that forbidden items are not included in the vehicle. The customer may enter such restriction zones into their tag list or the system could be enhanced the system 100 features by using the server 110 and database 140 to collect such restriction zone on a national basis advise the customer of such restriction zone as they approach.

Object specific rules may be established to ensure careful handling of a specific item. In one example, the item may be a weapon or firearm. Because these items may be dangerous and may have certain legal ramifications if possessed by an unauthorized person, the item itself may have specific rules associated with it. In another example, the item may be an expensive or important piece of equipment. The object specific rules may be used to track the equipment. In addition to locating the equipment for convenience, the equipment may also be tracked for purposes of maintaining information about the equipment. For example, the object specific rule associated with a piece of equipment may include tracking the equipment's whereabouts at predefined intervals. By tracking the vehicle's location, as indicated using the GPS transceiver 155, a business owner may determine how often a certain item is in use. In a specific example, a trailer may be tracked and based on the various location data gathered by the inventory system 100, the approximate mileage covered by the trailer may be estimated. Further, the system may log that the trailer was used on a weekend or late night which may be an unauthorized usage scenario.

Items may also be tracked for other statistics such as road hours, age in calendar time, vehicle mating characteristics, maintenance schedules, replacement parts, shelf life of other items such as emergency fuel, food, medication, etc. These statistics may be tracked specific to the item regardless of which vehicle 105 within a fleet it has been associated with. This may allow family members and business owners to easily maintain records about the use of certain items without undue calculations across multiple vehicles 105-1, 105-2, 105-n.

As explained above, categories may be created by the users to help organize the tags 175 associated with the items. These categories may relate to personal items, professional items, business equipment, etc. A medical category is described above. Other exemplary categories are sports equipment, camping equipment, daily items (e.g., items taken daily to work, school, etc.), hunting equipment, travel items, commercial and retail inventory (e.g., nightly drop money bag, traveling nurse kit, promotional items for independent sales, pizza deliveries, etc.), law enforcement equipment (e.g., firearms, protective vest, radio, etc.), and baby/children's gear (e.g., stroller, diaper bag, toys, etc.). These categories may be recalled at any time to edit the rules for the category, to take inventory based on the category, etc.

FIGS. 6A-6D show exemplary interfaces for showing various routes and rules and lists associated therewith. These interfaces may be visible to a user within the vehicle 105 at a vehicle console. The interface may also be viewed at the user device 115. The rules and lists associated with each route may be defined and edited by the user. The routes may be user defined by selecting two endpoints or points of interest and defining the route as there between. The route may also be a learned route. The controller 150 and/or server 110 may use data stored in the database 140 to determine which routes are most often traveled, at what time of the day the routes are traveled and what items are present in the vehicle 105 during the route. A rule may be automatically created based on the aggregation of this information from the database 140.

Figure 6A:
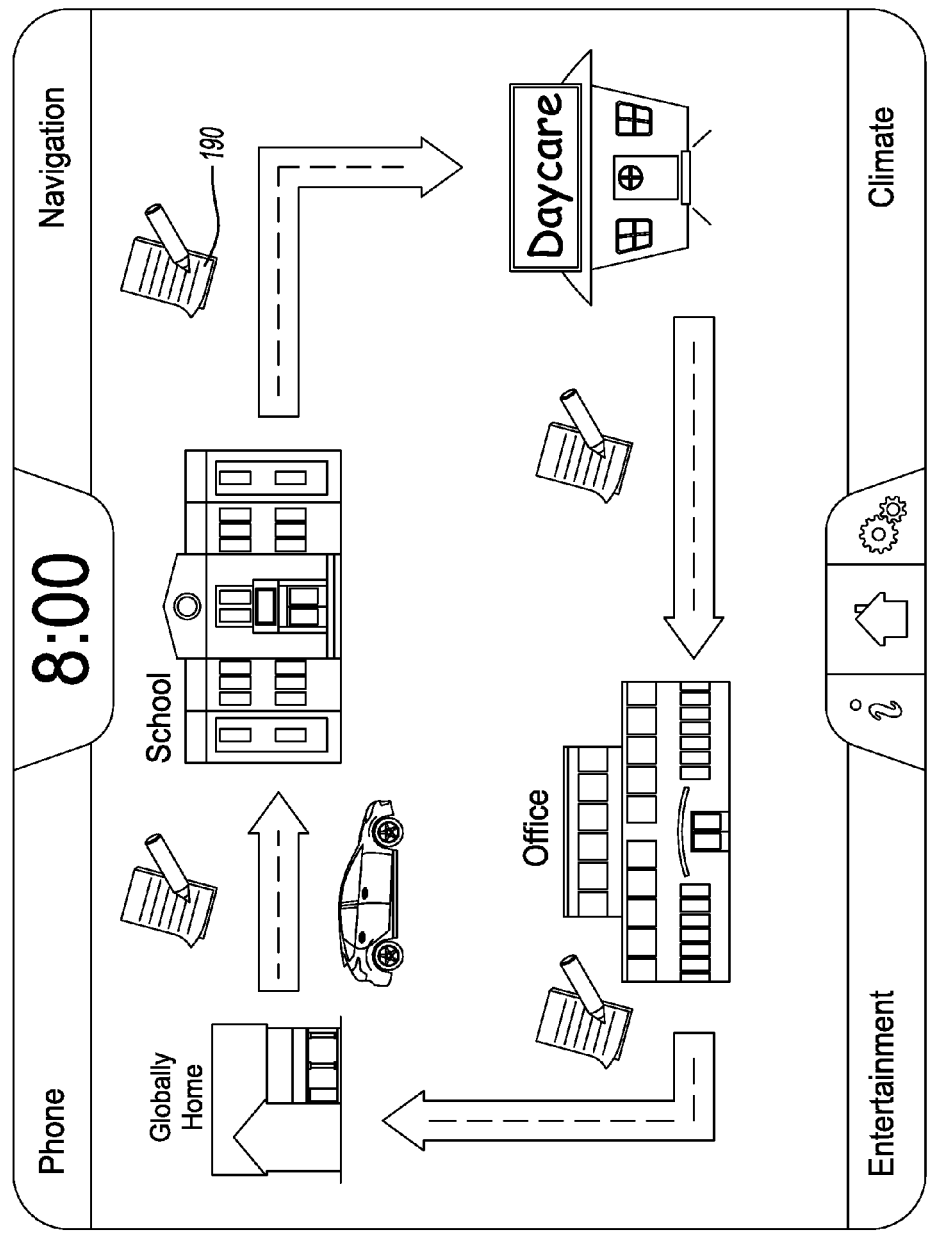
FIGS. 6A through 6D are display interfaces for managing vehicle inventory.
Figure 6B:
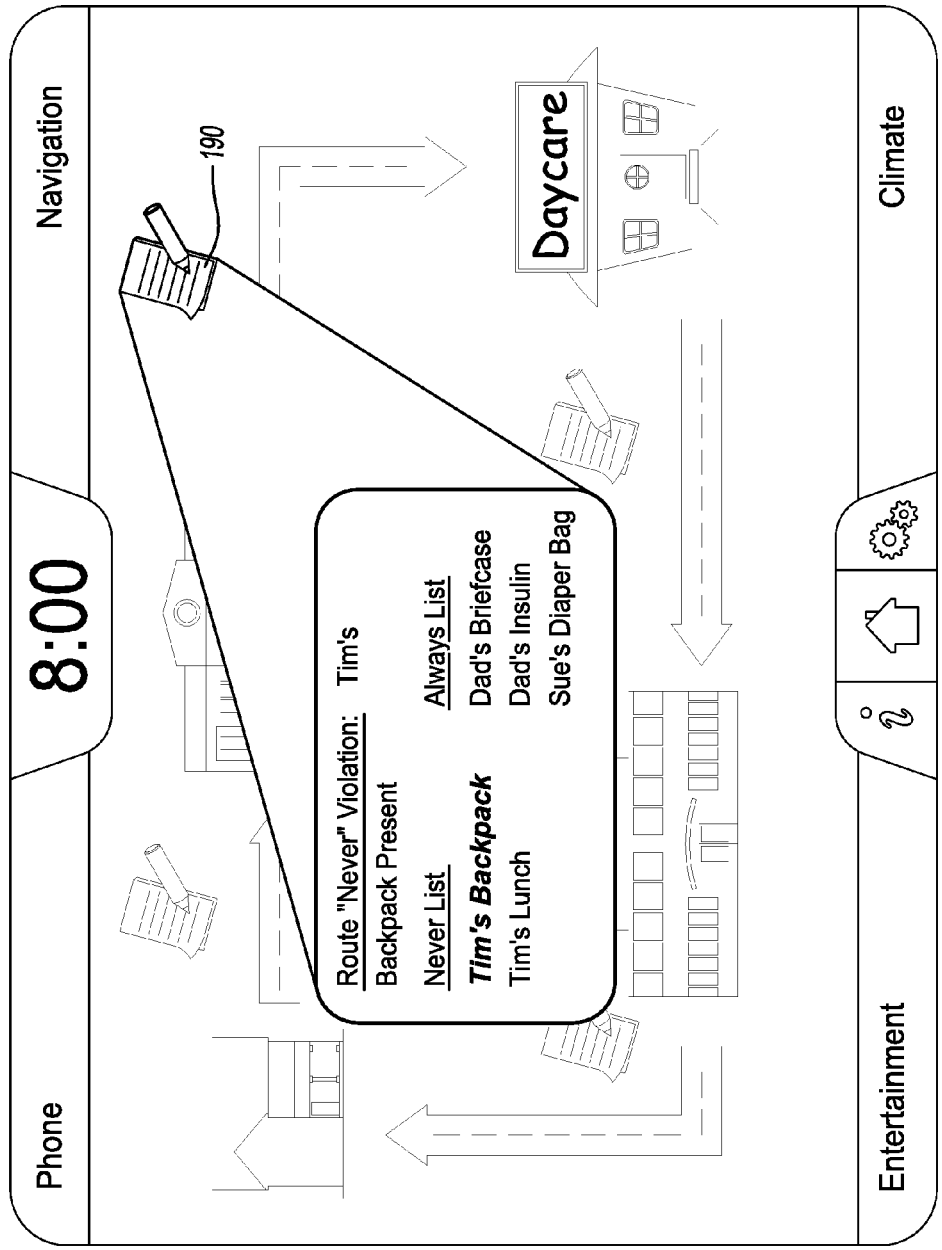

The system may also be configured to function with no specific routes but just by geofence zones. This could also include rules based on time and/or days of the week. For example, when leaving the home on weekdays before 8 am, the vehicle shall always have content list #1 which may include the user's briefcase and diaper bag. Or, in the absence of a route, entering the zone of a school, airport, military base or other restricted zone would initiate a search for tagged items and initiate an alert if a firearm was detected. FIG. 6A shows a series of exemplary routes including a route from home to school, from school to daycare, from daycare to the office and from the office to home. Each route may have rules associated with it. The rules and/or lists may be represented by an icon 190. When selected (e.g., clicked on using a computer mouse, touched via a touch screen, etc.) the rule for the selected route may be visible as shown in FIG. 6B. The rules may include a list or multiple lists listing required and/or forbidden items. For example, the route from home to school may include book bags and lunches for the children being dropped off at school, a diaper bag for a baby being dropped off at daycare, and a briefcase for the driver/parent. At each stop along the route, rules may be applied in order to ensure that items are not left in the vehicle 105. That is, when the vehicle departs a point of interest, the system 100 may check that a critical item is not left in the vehicle 105. For example, a child's lunchbox and book bag should never be in the vehicle 105 on the route from school to daycare.

FIG. 6B shows an exemplary rule for the route from school to daycare. The rule should include a 'Never List' and an 'Always list.' The never list may include items, such as the lunch box and book bag, that should never be within the car after school drop-off. However, other items, such as the briefcase, insulin and diaper bag should. Upon realizing that a rule has been violated, an alert may be realized by the vehicle occupants. This alert may be, for example, a visual warning on the interface that a 'Never' item is present. In this example, the alert may indicate "Route 'Never' Violation: Tim's backpack present." Other forms of alerts may include audio alerts, tactile alerts (e.g., user device 115 may vibrate), etc. Additionally or alternatively, a route may change colors indicating that a rule has been violated. For example, the dotted line at the route from the school to daycare may turn red, indicating that there is a problem with the current inventory. A user may then select the icon 190 to see which rule has been violated.

Figure 6C:
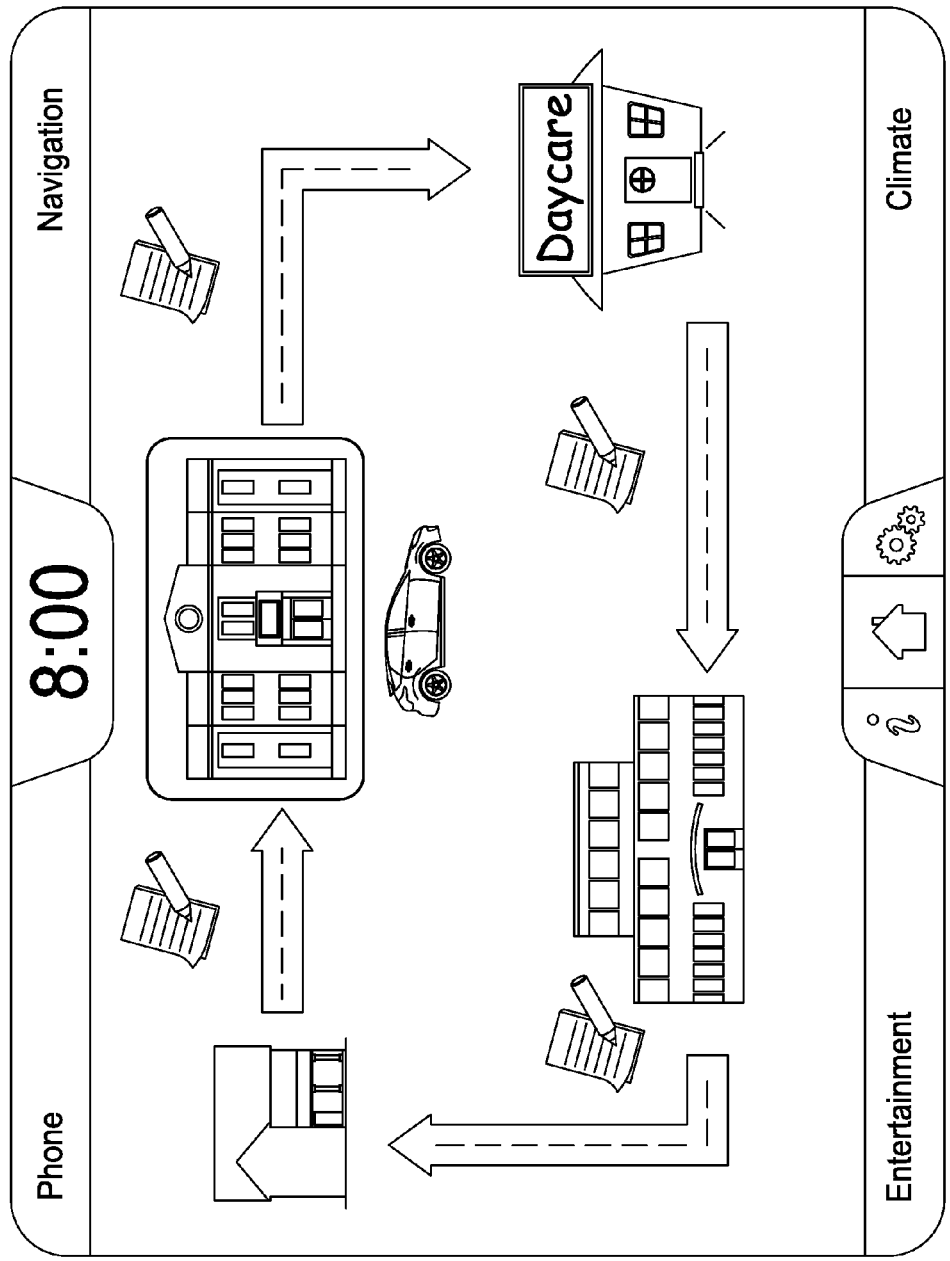
Figure 6D:
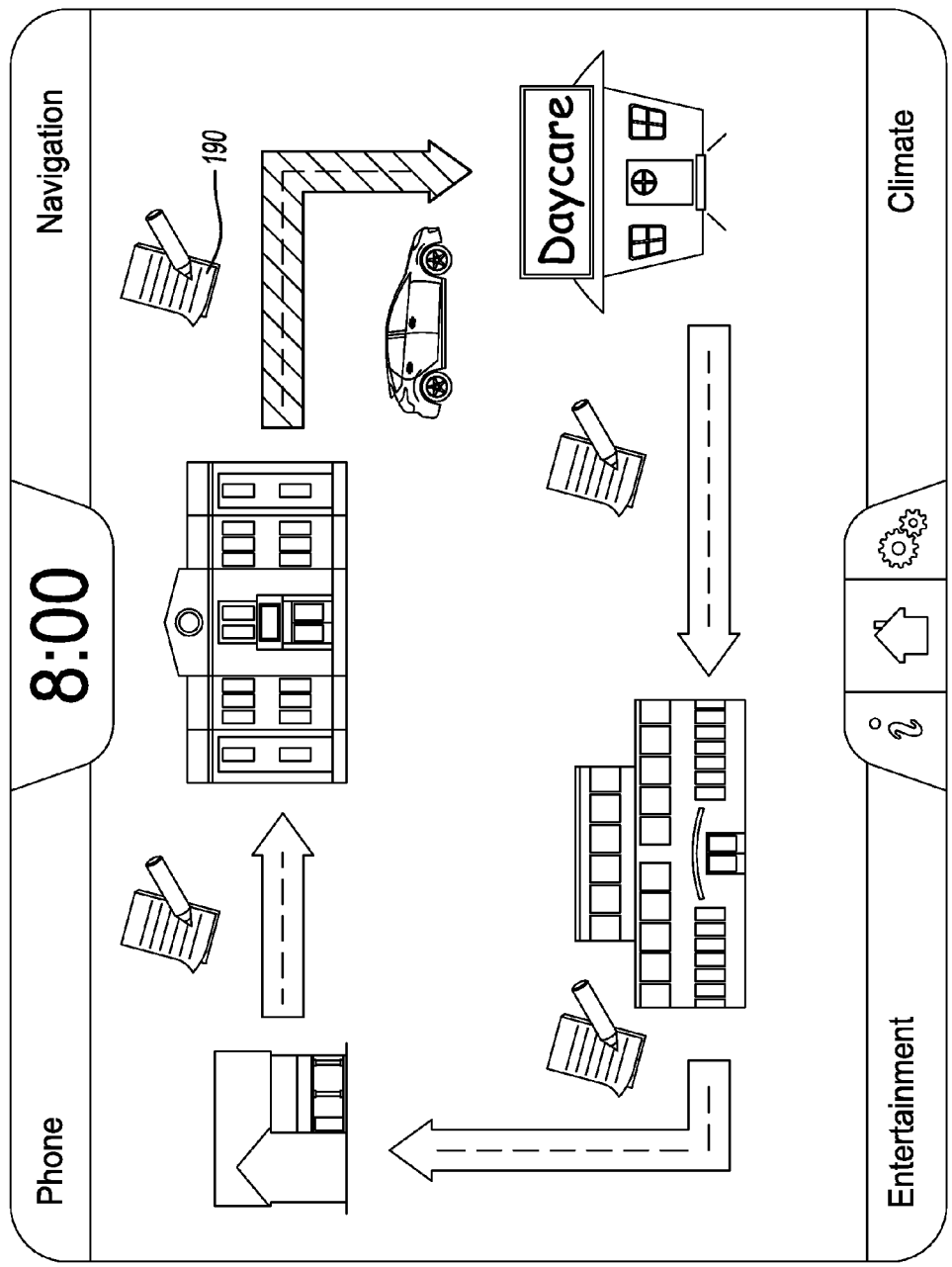

FIG. 6C shows an exemplary interface highlighting the current location along a series of routes. In this example, the school is highlighted indicating the current location of the vehicle. The vehicle function controller 150 may receive location information from the GPS transceiver 155 and use this information to determine the current location of the vehicle 105. FIG. 6D shows an exemplary interface highlighting the current route along the series of routes. A vehicle icon may also be displayed on or along the route (see FIG. 6C). The interface may be updated to show the continuing progress of the vehicle 105 as it moves along the route. In addition to the routes, the rules may be visible by selecting the icon 190. The graphical interface may also show no routes but rather just locations. If the user is not in any geofence zone around the designated locations, no location would be highlighted. If the vehicle did enter one of the designated geofence locations, the interface would highlight the zone where the vehicle is located (e.g., green if the content lists are satisfied and red if there is a violation relative to the location contents list for the subject vehicle and/or driver).

In addition to the routes and rules, the interface may also show pictorial icons associated with various objects. For example, if a tag 175 is associated with a purse, and the tag 175 is detected by the antenna 170, then a purse icon may show up in the interface. The various icons associated with the tags 175 may be established by the user when the rules are created or when items are associated with the tags 175. That is, when a user attached a tag 175 to an item, the user may use the interface, either at the vehicle 105, server 110 or user device 115, to associate an icon with the tag 175. The icon may represent the item associated with the tag 175 (e.g., an icon of a purse when the tag is attached to a purse.)

FIG. 7 shows an exemplary process 700 for applying the rules. The process begins at block 705. At block 705 the system 100 may recognize a rule event. A rule event may be any event that triggers the system 100 to apply a rule. As shown by way of example only in FIG. 7, the rule event may be one of receiving a high frequency response identifying a tag at 710, receiving an indication of an environmental event at block 715 and/or receiving a query event at block 720.

At block 710, a high frequency response may be received from a tag 175 within the vehicle 105. The tag 175 may be associated with a person or item and may trigger driver specific rules and/or object specific rules. For example, the response may be received from a key fob 160 associated with a driver. In this example, the high frequency response may identify the driver associated with the key fob 160. In another example, the tag 175 may be associated with an item. The item may be a special item that deserves its own rules. In one example, the item may be a weapon or firearm. Because these items may be dangerous and may have certain legal ramifications if possessed by an unauthorized person, the item itself may have specific rules associated with it. For example, a firearm should never be in a teen's car, etc. The high frequency responses may be received be in response to a low frequency challenge emitted by the antenna 170. Such challenges may be initiated based on a passive entry activity as described below.

At block 715, an environmental event may include certain environmental factors such as environmental factors including the location of the vehicle 105, the route the vehicle 105 is traveling, the time of day, the weather and specifically the temperature inside the vehicle, among others. Thus, when a specific environmental event occurs, a rule associated therewith may be triggered. For example, when the temperature in a vehicle 105 reaches eighty degrees Fahrenheit, the system 100 may recognize this environmental event as a rule event. This event may be transmitted to the user device 115 for all users of the system or just pre-designated devices.

At block 720, a query event may be recognized as a rule event. In this example, a user may request a query of items within a vehicle 105. Additionally or alternatively, some event recognized by the vehicle 105 may be a query event. This type of event may include a determination that a driver has entered the vehicle 105, opened the vehicle door, placed a key in the ignition, exited the vehicle 105, etc. Thus, these events may trigger a query by the inventory system 100. A query event may also be facilitated by periodic spot checks. That is, the system 100 may perform queries throughout the day at periodic intervals.

Further, users may request a query by pressing an appropriate icon or button on the interface. The request may also be made from the user device 115. A user initiated query may be a general query where an inventory of all items is taken, or it may be an item specific query where a specific item is selected and searched for. In the latter example, the selected item may be recalled in the database 140 to find its last known location. It may also be searched for among a fleet of vehicles 105 to see if it is currently located within one of the vehicles 105. In one example, if a tag 175 is associated with a user's baseball glove, the user, using his or her user device 115, may select the glove and a query would be run to search each vehicle 105 for the glove. Each vehicle 105 in the fleet, which may be each vehicle 105 owned by a family, may be instructed to transmit a low frequency challenge via the antenna 170 within the vehicle 105. This command may be transmitted by the server 110 and/or the user device 115.

Special query events may also occur that trigger the inventory system 100 to check the vehicle contents. In one example, the inventory system 100 may perform an inquiry when the vehicle security system has been triggered.

Once a rule event is recognized, the controller 150 or server 110 may receive vehicle item data at block 725. This data may include a list of items within a specific vehicle 105 as determined by one or more high frequency responses.

At block 730, the controller 150 or server 110 may receive at least one rule associated with the rule event. The rule may be retrieved from the database 140 and may be associated therein with the rule event. For example, if the rule event is a physical location such as a border crossing, a rule or set of rules associated with the border crossing may be retrieved. These rules may maintain that weapons are not permitted at the border. In another example, if the rule event is a driver specific event, a rule associated with the recognized driver may be retrieved, such as the rule for driver A, explained above with respect to FIG. 5.

At block 735, the controller 150 or server 110 may analyze the vehicle item data in view of the at least one rule. That is, the rule may be applied to the list of items within the vehicle 105. In one example, a list of forbidden items within the rule may be compared with the list of items within the vehicle 105. Similarly, required items as defined by the rule may also be applied.

In some situations several rules may be applied. This may be the case when more than one occupant is recognized and more than one occupant has rules associated therewith. It may also be the case when both an environmental rule event and a driver specific event are recognized.

At block 740, the controller 150 or server 110 may determine whether a rule has been violated. By comparing the list of items within the vehicle 105 with the list of required and forbidden items, the controller 150 may determine whether an item is missing or whether an item should not be in the vehicle 105. In some situations, more than one rule may be applied. For example, if driver A and driver B are both in the vehicle 105, and while each rule associated with each driver includes forbidden items (e.g., prescription medication and firearms), because these items are required items for one of the other occupants, no rule is violated. However, although driver B is authorized to carry a firearm, such firearm may still be forbidden based on an environmental rule (e.g., border crossing.)

If it is determined that the rule has been violated, the process proceeds to block 745, if not the process ends.

At block 745, an alert may warn the occupants of a missing or forbidden item. As explained, this alert may include a visual, audio, or tactile alert. The alert may be realized by the vehicle occupants. The alert may also be transmitted directly via the vehicle telematics system to a remote location or other user device 115. For example, a list of missing items determined after a security alarm has been triggered may be transmitted via email or SMS to a system administrator or directly to a security guard post or the local police. In another example, an alert of a missing item may be transmitted to the server 110. The server 110 may then query all other vehicle 105 in the fleet to determine if the missing item is located within one of them. Additionally, a text message may be transmitted to another user device 115. In this example, if certain family members are in one vehicle 105 that has just left an area, such as a ball field, and other family members are still at the field, the remaining family members may become aware, or can be notified, of the forgotten item and retrieve it. The process may then end.

Figure 8A:
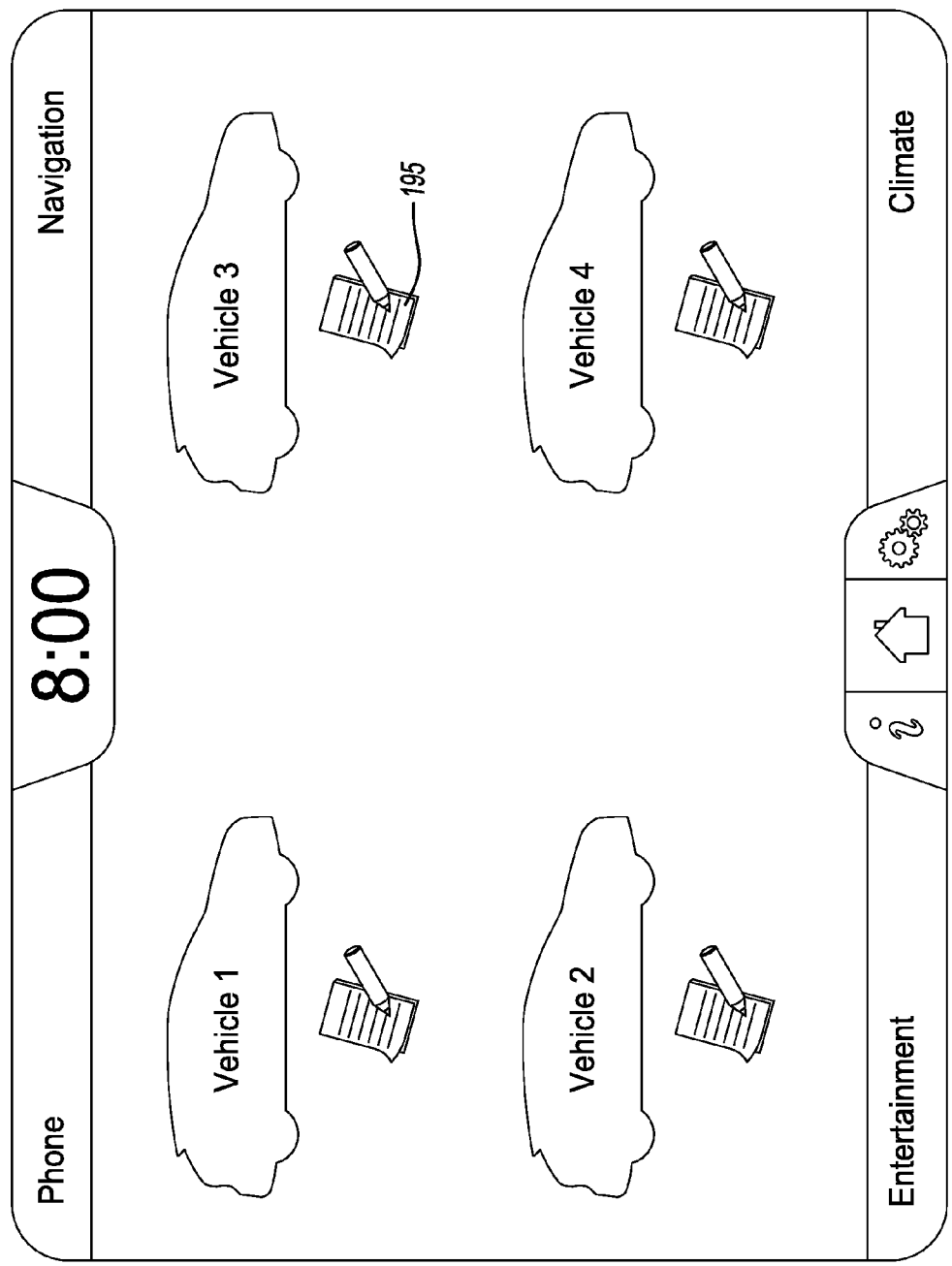
FIGS. 8A through 8C are display interfaces for managing rules of the inventory system.
Figure 8B:
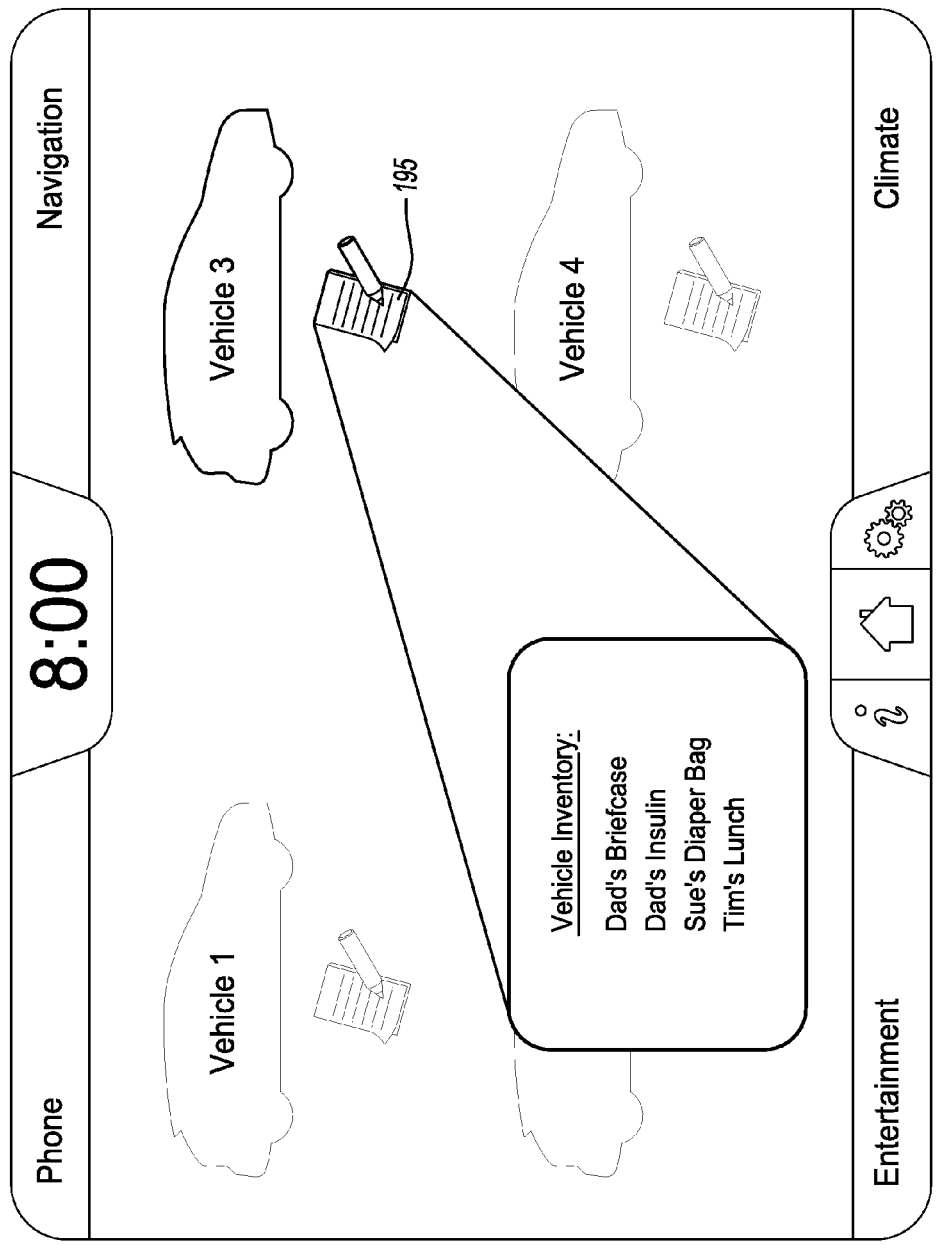
Figure 8C:
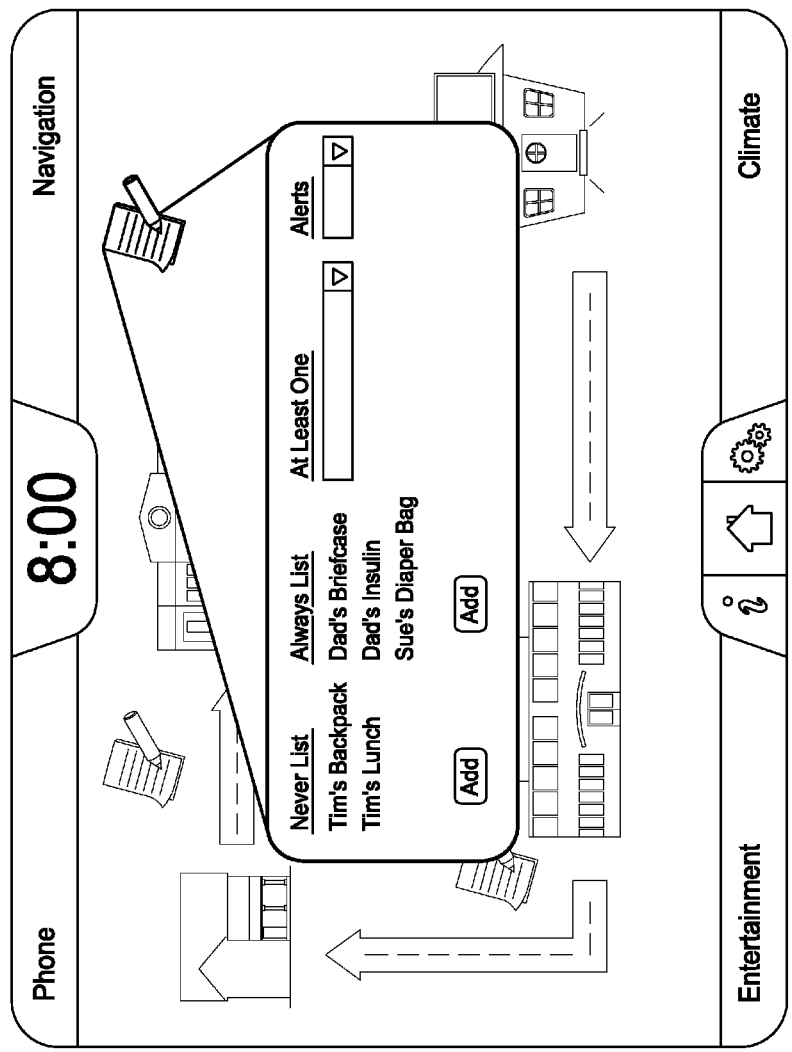

FIGS. 8A-C show exemplary interfaces for managing vehicle inventory. As explained, the inventory system 100 allows several vehicles 105 to be monitored, both locally within a vehicle 105 and remotely at a server 110 and/or user device 115. FIG. 8A is an exemplary interface for a management of a fleet of four (4) vehicles 105, each represented by a vehicle icon. As shown, each vehicle 105 may be labeled by number. Additionally or alternatively, each vehicle 105 may be named. In a familial fleet, a vehicle 105 may be associated with each driver's name, or other identifiers such as "mom's car." In a business fleet, each vehicle may be identified by its type or name. In one example, a construction fleet may have "bulldozer," "dump truck," etc. Each vehicle 105 may be associated with a list icon 195. FIG. 8B shows an exemplary interface upon selection of the icon 195. In this example, selecting the icon may display a list of items currently within the vehicle 105 associated with the selected icon. Other vehicle information may also be displayed, such as the vehicle location, speed, mileage, etc. By having an interface that allows a user to view the inventory of various vehicles 105, an efficient system for keeping track of inventory across a fleet of vehicles 105 is achieved.

FIG. 8C is an exemplary interface for editing and creating rules to be implemented by the inventory system 100. FIG. 8C shows a rule creation screen for creating rules along a specific route. This is exemplary, and rules may be created for various other events such as rules specific to drivers and environmental factors. In the example, along any route, a rule may be created and may include zero, one, or more of required and proscribed/forbidden items as shown in the figures. The rules may be customized in various ways. Various drop down menus may be available to select different options. In one example, a vehicle drop down menu (e.g., the "at least one" menu) may allow a user to select from a plurality of options such as which vehicle 105 the item must be located in and what type of alert to issue if the rule is not complied for the designated vehicle 105. The alert option may include issuing an audible warning via the vehicle speakers, sending an SMS message to the driver's mobile device, restricting use of certain vehicle features (e.g., the accelerometer, etc.) On the route from school to daycare, a diaper bag may be required to be present in a specific vehicle 105. However, another route, such as an after work pickup at daycare, may require that the diaper bag be present in at least one vehicle 105 as opposed to a specific vehicle 105. Additionally, "Add" buttons may be located in the rule screen to add items to a 'Never List' or an 'Always List.'

The options described above for creating and editing a rule may be implemented using multiple interface screens. These screens may be displayed in an order that is based on a user selection. That is, a screen may present the options to "Create a New Rule" or "Edit an Existing Rule." The next screen may depend on which of these two options was selected.

These exemplary screen shots are simply examples of how a user may customize an inventory system to his or her needs. Although not shown, other interfaces may facilitate the editing and creation of rules. A chart listing various vehicles 105, the drivers associated therewith and routes typically taken by each vehicle 105 may be displayed via an interface. Such a chart may allow a user to select items from drop down lists, click and drag items to the appropriate vehicle 105 and/or deriver, etc., to create a series of rules. Furthermore, the information maintained by the system 100 such as various item statistics may be viewable in as a chart or graph. The various interfaces, as explained, may be accessible via the user device 115, the vehicle display, and/or the server 110. Additionally, the system may suggest some geofence zones for the lists based on observed driving routes, times, days, and other identifying patterns. For example, the system 100 would easily be able to identify the home, school, or office based on repeated drive patterns over a one or two week period.

Figure 9:
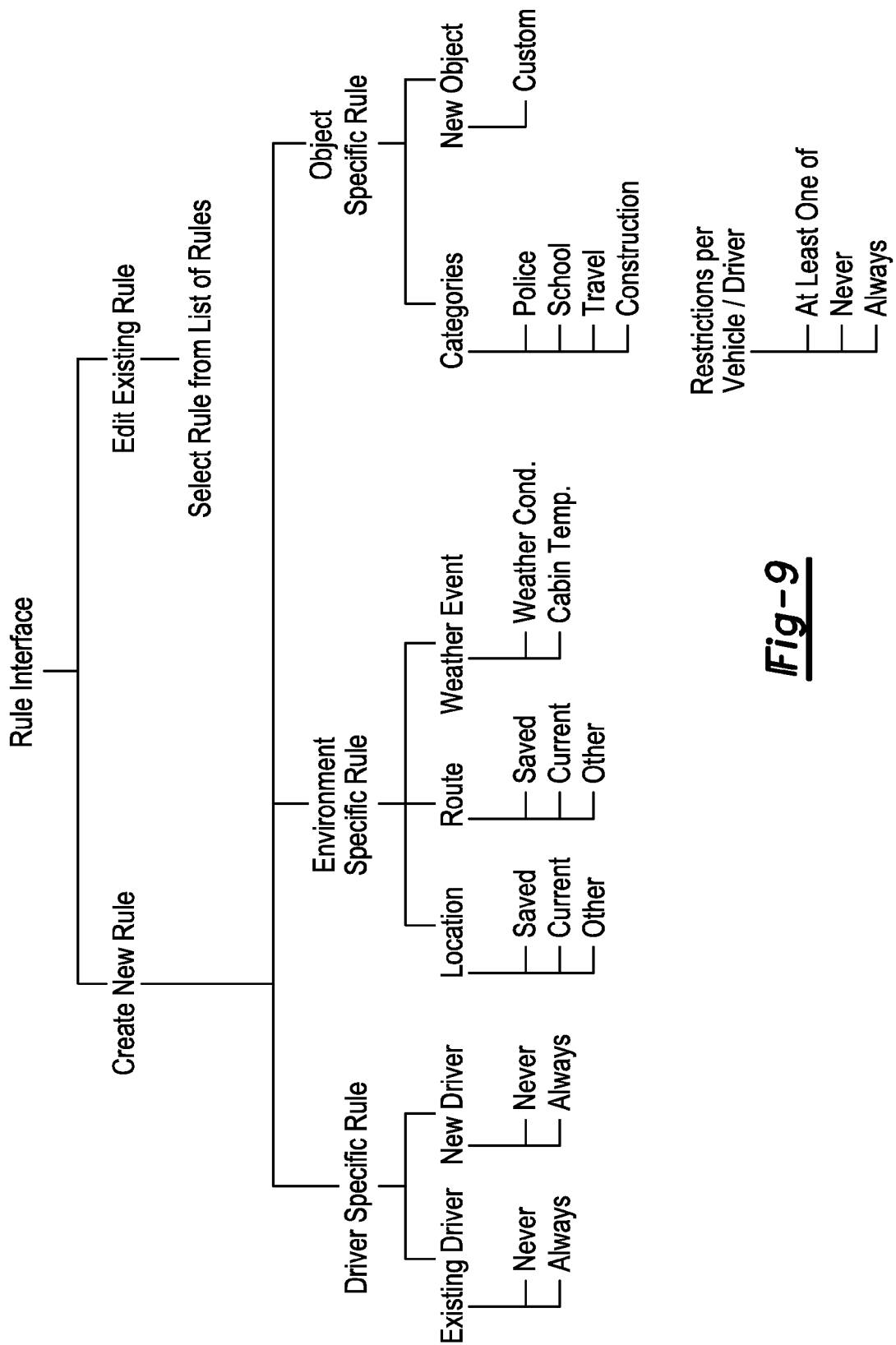
FIG. 9 is a process flow for managing rules of the inventory system.

An exemplary process flow for creating and editing rules is shown in FIG. 9. FIG. 9 may present a user with the option to create a new rule, or edit an existing one. Upon selecting to create a new rule, a user may select what type of rule to create. As shown by way of example, a driver specific rule, environmental rule or object specific rule may be selected. If a driver specific rule is selected, rules for an existing client may be edited, or rules for new drivers may be created. Each rule may list at least one item as a 'never' item or an 'always' item. For environment specific rules, various types of rules may be selected. As shown by way of example, a location, a route and a weather event may be selection for rule creation. Each of a location and route may be selected from a list of saved or existing locations. The current location of the user or the vehicle 105 may also be used for rule creation. In one example, if a user is at a baseball field for practice, he or she may create a rule based on his or her currently location and list all items needed for baseball practice.

A rule may be created for a weather event as well. An example of a weather event may be the temperature falling below or exceeding a certain threshold. For example, a rule may be created to send a text message to a user device 115 if the cabin exceeds 80 degrees Fahrenheit, or is approaching freezing, and if a certain tag 175 is within the vehicle. In one example, if a perishable item is tagged, the user may want to be warned if the heat or cold within the cabin could harm the item.

An object specific rule may be created for certain items. In the examples described herein, a firearm may have specific rules associated with it due to its dangerous nature. The object specific rules could be created by creating a new item rule or selecting from existing items to edit the rules associated with that item. These existing items may be organized by categories as described above. Each category may have a rule associated with it, as well as the individual object within the category. The rules for each object may include restrictions as to a specific user, location, event, etc. These restrictions may also depend on other factors such as who else is in the vehicle. In one example, a firearm may have a rule that it may only be in a vehicle 105 if a person registered to carry the firearm is also in the vehicle 105. Thus, if driver A is alone in the vehicle 105, the firearm is a forbidden item. However, if driver B is with driver A in the vehicle 105, then the firearm is a permitted item, but maybe not be a required item. However, the firearm may be a proscribed or forbidden item when approaching a border crossing. Thus, in creating a rule for the firearm, at least driver B must be in the vehicle 105 with the firearm, but the firearm must never be in the vehicle 105 at a location around a border crossing.

In creating a new object rule, a similar process may be followed. The new item may be categorized, or selected from a category. Specific limitations or restrictions may be placed on the item, as described herein. In editing an existing rule, similar processes may also be followed. The rule may be selected from a list of rules. Drop down menus, icons and other visual indicators may be used throughout the process to create a user friendly system of managing the rules, objects, drivers and vehicle 105 within the inventory system 100.

FIGS. 10A-E show exemplary diagrams depicting a radio frequency protocols for receiving various high frequency responses. FIG. 11 shows exemplary intervals for receiving high frequency responses for the inventory system. Because the tags 175 may share a fixed frequency with other devices, such as PEPS key fobs 160, the antennas 145, 170 must be managed so that they listen and transmit at specific times and intervals to avoid interference of the tags 175 with the existing PEPS, TPMS, and RKE systems. That is, a high frequency response from a tag 175 may not overlap with a high frequency response from a PEPS key fob 160. Both the tags 175 and the PEPS key fobs 160 may listen for low frequency challenges from the antennas 170. However, each will only respond via a high frequency response to a respective challenge (e.g., a tag will only respond to a tag challenge and a key fob 160 may only respond to a PEPS or approach detection challenge.) A challenge identification, hereinafter referred to as a challenge ID, may be embedded in each low frequency challenge. This challenge ID may indicate whether the challenge is a tag challenge, a PEPS challenge (for passive entry or passive start) or an approach detection challenge (for detection of the arrival of the customer at the vehicle exterior). A receiver and control function software in each of the key fobs 160 and tags 175 may determine, based on the challenge ID, whether or not the device should respond to the challenge.

In order to avoid interference between high frequency key fob 160 responses and tag responses, the antenna 145 may only listen for tag responses after the window for key fob 160 responses concludes. By coordinating the response times for high frequency responses from the devices, the risk of collisions between the various responses may be reduced, if not eliminated.

High frequency responses may be transmitted from other systems within a vehicle besides PEPS systems and inventory systems. For example, tire pressure monitoring systems (TPMS), RKE protocols, WMAP ultra high frequency protocols, and PEPS ultra-high frequency protocols, may all transmit signals intended to be received via the shared antenna 145. These are outlined in detail below with respect to FIGS. 10A-E. Some of these ultra-high frequency signals cannot be controlled by the controller 150. For example, commands initiated by the key fob, such as lock, unlock, panic, open trunk, etc. In another example, the TPMS transmitters may act independently of any commands transmitted by the controller 150. The TPMS may also implement frequency-shift keying (FSK). When the TPMS enters into an FSK ultra high frequency priority mode, any tag challenges may only transmitted when the vehicle 105 is traveling under roughly 8 kilometers per hour unless the tags are capable of transmitting in FSK or audio-shift keying (ASK). In addition to transmitted signals from devices associated with the vehicle, signals from outside the vehicle system may also cause some interference. In one example, high frequency responses from other key fobs 160 associated with other vehicles may be received at the antenna. Additionally, low frequency challenges from other vehicle approach detection systems may also cause interference.

However, by coordinating the response and transmission times for the various vehicle systems (e.g., inventory system, PEPS system, etc.,) a protocol may be developed to mitigate or eliminate interference of high frequency responses between the systems. This protocol may specify that while using a common protocol, the low frequency challenges and the high frequency responses may be different for each of the PEPS system, approach detection system, and inventory system. Each device (e.g., the key fob 160 and tag 175) may listen for low frequency challenges. The challenges associated with each of the PEPS, approach detection and tag systems may include different challenge IDs and message instructions. A receiver within the tag 175 may not wake a tag microprocessor unless the challenge is a tag challenge. That is, any PEPS or approach detection challenges for normal PEPS or detection scanning will not affect the tag 175.

In the event that a PEPS or detection challenge is transmitted while a tag challenge is being processed by the tag 175, the tag 175 may then abort processing the tag challenge so as to allow other devices to respond to the PEPS or detection challenge. For example, if the tag microprocessor is processing a tag challenge, but in the meantime another low frequency challenge has been transmitted for a PEPS device, the tag 175 may cease the processing of the tag challenge to allow the PEPS device to respond to the PEPS challenge. In this example, an advisory to cease processing may be transmitted from the chip to the tag microprocessor. That is, while the tag challenge is processed, the chip may be capable of hearing other low frequency challenges and submit an advisory to the microprocessor of the tag in the event another challenge is heard. By ceasing the processing of the tag challenge, the tag 175 may not respond to the tag challenge and avoid any interference with other responses from the non-tag challenge. In a specific example, if an approach detection challenge is heard by the chip, the chip may suspend processing of a tag challenge for 150 milliseconds. This processing delay may allow enough time for the PEPS high frequency response to be transmitted in response to the approach detection challenge. Additionally or alternatively, a tag challenge shall not wake a microprocessor in the key fob 160. Further, the high frequency responses of each of the key fobs 160 and tags shall not affect one another.

Figure 10:
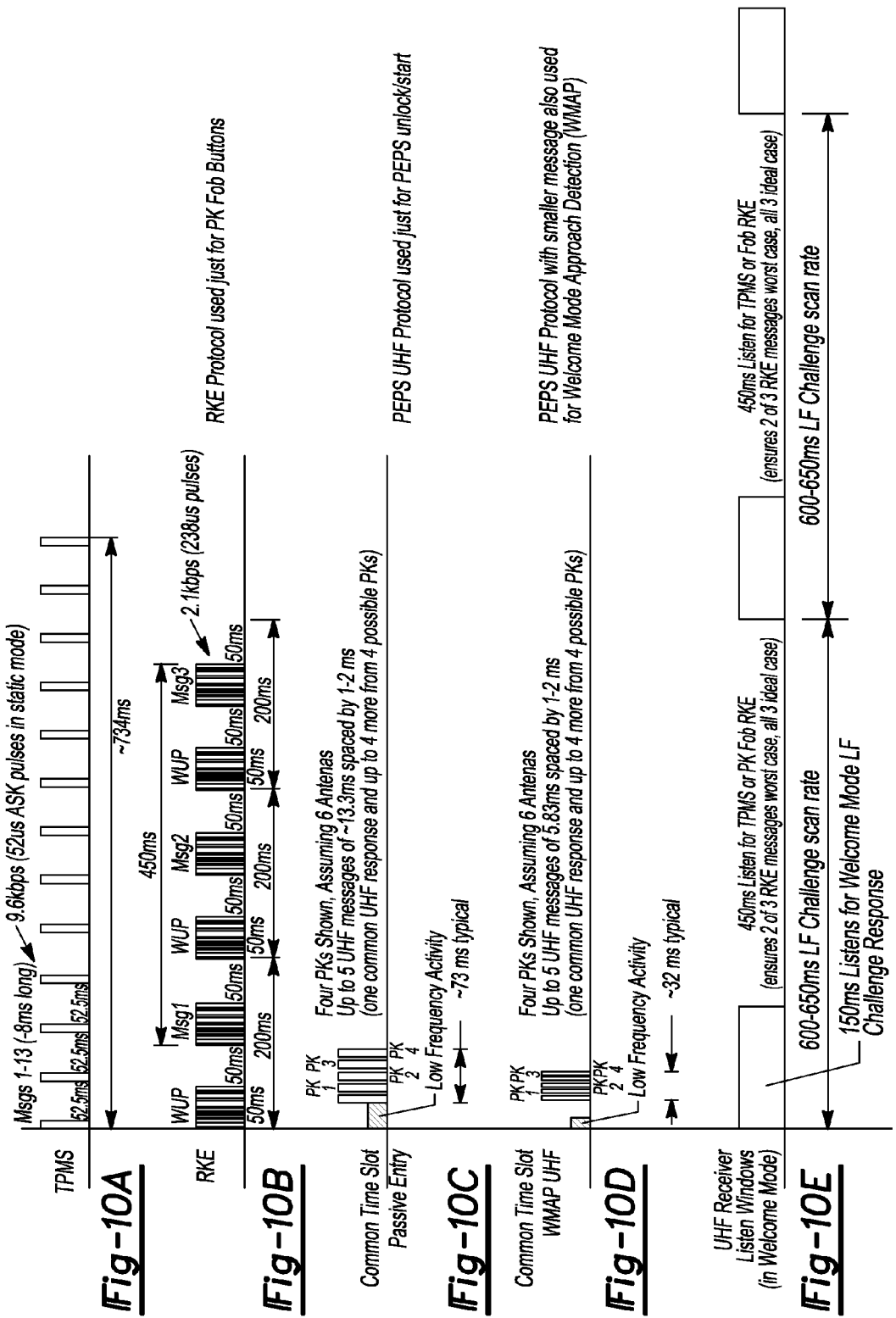
FIGS. 10A through 10E show diagrams depicting radio frequency protocols for transmitting low frequency challenges and receiving various high frequency responses.
Figure 12F:
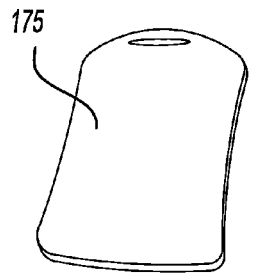
Figure 12G:
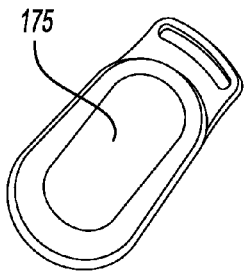
Figure 12H:
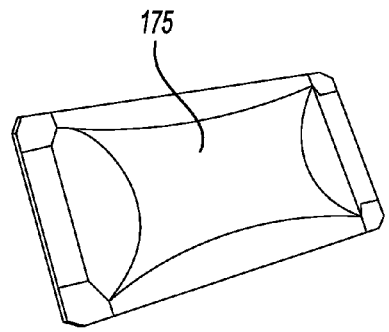
Figure 12I:
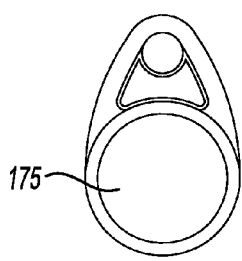
Figure 12J:
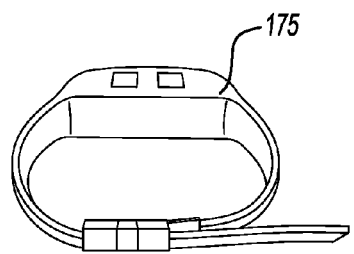
Figure 12K:
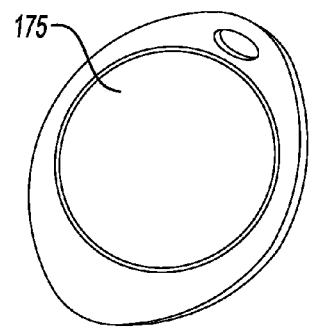
Figure 12L:
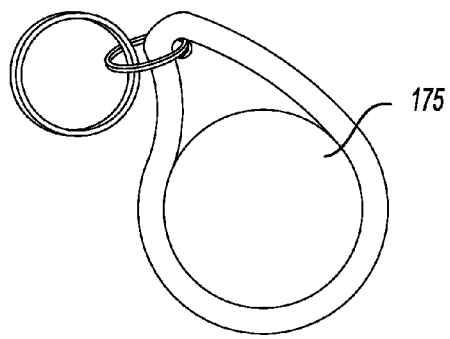
Figure 12M:
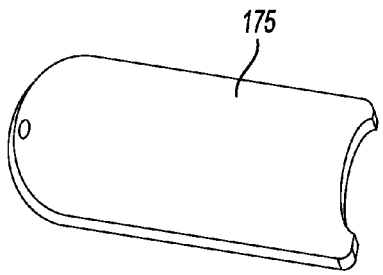

Referring again to FIG. 10, various radio frequency protocols for vehicle systems are shown. FIG. 10A shows an exemplary protocol for a TPMS where thirteen (13), 8 ms messages are transmitted every 52.5 ms over approximately a 734 ms period. FIG. 10B shows an RKE protocol. This protocol is used to transmit messages upon command from the key fob 160 using key fob buttons (e.g., unlock, lock, panic, etc.). These messages are transmitted after an initial wake up every 50 ms for 238 μs every 200 ms. The passive entry high frequency protocol, as shown in FIG. 10C, may transmit low frequency challenges and in response receive high frequency messages of approximately 13.3 ms spaced every 1-2 ms within a 73 ms period. A welcome approach detection protocol, as shown in FIG. 10D, may transmit a detection challenge and in response receive up to five (5) high frequency responses of approximately 5.83 ms every 1-2 ms within a 32 ms period. FIG. 10D shows a 150 ms listening period for PEPS and detection high frequency responses followed by a 450 ms listen period for TMPS and RKE responses.

FIG. 11 shows exemplary intervals for receiving high frequency responses for the inventory system at the antenna 145 in order to mitigate or eliminate interference between the tag responses and key fob responses. Various low frequency challenges may be transmitted by the antenna 170. As explained, these challenges may be specifically directed to key fob activity (including PEPS challenges and approach detection challenges), and to inventory inquiries (tag challenges). The key fob challenges may not overlap with the tag challenges, and the key fob responses may not overlap with the tag responses. To avoid any overlap, the controller 150 may instruct the antenna 170 to transmit and listen at various intervals for specific types of signals. The antenna 170 may transmit key fob challenges for a first interval 220. Following these low frequency transmissions, the antenna 145 may listen for key fob responses. These responses may include information from the key fob 160 to authenticate the key fob (e.g., to unlock a vehicle door, etc.). The antenna 170 may also transmit tag challenges during the second interval 225. After the listening period for key fob responses has ended, the antenna 145 may then begin to listen for tag responses during a third interval 230. Thus, while the antenna 145 may listen for a response while transmitting a challenge, the different challenge signals, and the different response signals, do not overlap.

To reiterate, a key fob listening period and tag challenge period 225 may commence at the end of the key fob challenge period 220. At the end of the tag challenge period 225, the tag listening period 230 may commence. The key fob listening period and tag challenge period 225 are shown in FIG. 11 as occupying the same period, however, while these periods may overlap, they may only overlap for a portion of the period (e.g., the key fob listening period may be shorter or longer than the tag challenge period.)

The intervals may be determined by various keyless entry actions and human initiated actions, such as pressing a button on the key fob 160. When an action is detected by the controller 150, the controller 150 may calculate the expected response period for the key fob responses (i.e., interval 225). The controller 150 may also calculate the response period for the tag responses (i.e., interval 230) based on the key fob response period. The controller 150 may instruct the antenna 170 to transmit tag challenges after the key fob challenges have been transmitted in order to ensure that no tag responses are received during the key fob response period. Thus, the controller 150, upon receiving high frequency responses from various devices, can determine which system the response is directed to (e.g., the PEPS system or inventory system) and eliminate any interference by the tags with existing systems.

Once an action is recognized, the antenna 170 may transmit ten (10) or more low frequency challenges in response to human initiated actions. These actions may occur while a driver approaches a vehicle, during door opening or closing, during engine start or stop and during breaking or clutching. Because these actions most often occur during these recognized vehicle activities, the most optimal time to perform an inventory search may be upon the vehicle entering a drive gear or after the vehicle is keyed off. Additionally, as explained above, collisions between signals may be created by other sources such as other approach detection systems of nearby vehicles, inductive chargers, radio broadcast towers, non-programmed key fobs, etc. To ensure the quality of the inventory system is maintained, the controller 150 may control the listening and transmitting periods based on external actions in addition to key fob actions. This may include repeating an inventory search/inquiry in response to these external actions. These external actions may include a determination that the antenna's signal strength indicator (SSI) shows continuous ultra-high frequency activity. In this example, the controller 150 may instruct the antenna 170 to re-transmit the tag challenges. Another example of an external action is a determination that an earlier inventory inquiry violates a rule. That is, if a "never present" item is located within the vehicle, the antenna may repeat the tag challenges to verify that the rule has in fact been violated. Additionally or alternatively, upon determining that approach detection is active, the inventory inquiry may be repeated. Most importantly, in scenarios where the absence of a tagged item has been noted and that tag has been specified to be present for the specific vehicle, user, location and environmental conditions, it may be desirable to repeat the tag search multiple times to be certain the tag is truly absent and that interference was not the reason for the absence of a high frequency response from the tag.

The tag challenges may be transmitted independent of the state of the vehicle. That is, they may be transmitted whether the vehicle is running or not. Some inventory searches may be conducted only when the vehicle is in a certain state. For example, tag challenges may only be transmitted when the vehicle is off, or running at speeds below a certain threshold. By preventing the inventory system from transmitting signals during certain vehicle states, collision between signals of existing vehicle systems could be mitigated. In one example, some antennas are configured to switch from ASK to FKS listening mode when the vehicle exceeds 8 kph. In this example, the inventory system may only perform a search when the vehicle is in RUN at speeds below 9 kph.

The controller 150 may maintain a list of programmed tags. It may also receive the list from the database 140. The number of tags 175 programmed to the inventory system may determine the appropriate duration and intervals for the tag listen period. A typical listening period for each tag may be 15 ms. Thus, if twelve tags were programmed, the total listening period would be 180 ms. The controller 150 may group the programmed tags in order to shorten the tag listening period to avoid potential collisions with normal key fob and TMPS signals. For example, twelve tags may be grouped into three groups of four. Three tag challenges may be transmitted to search for the tags. Each challenge may have a listen time of 15 ms for each programmed tag. Thus, four tags in each group may result in a 60 ms listening period for each of the three groups. However, in the event that only three tags were programmed, each challenge may only require a listening time to hear the known number of tags in each group. If one tag was programmed per challenge group, the listen time would be 15 ms per challenge group. Thus, by knowing that only three tags were programmed, the listening time or tag response period is only 45 ms rather than listening for 45 ms after each of the three challenges for a total of 135 ms. By challenging up to four tags at a time, collisions between high frequency responses may be mitigated. The total combined low frequency challenge time and high frequency response time is less than that consumed by PEPS systems. This allows key fobs 160 and TPMSs to perform at a normal level. By limiting tag challenges to groups of four tags, the challenge and response time for the inventory system could be conducted during the 450 ms listening period of an approach detection system having a 700 ms period.

FIGS. 12A-M and 13A-B show exemplary tag configurations. As explained above, each tag may include a microprocessor chip and a receiver configured to listen for low frequency challenges. The tag 175 may also include a transmitter configured to transmit high frequency tag responses to the vehicle antenna. The receiver and transmitter may be on a top surface of the tag, so as to avoid any interference from the item when transmitting and receiving signals. As explained, the microprocessor will only be woken if a tag challenge is received by the tag 175. This may aid in prolonging the life of the battery within the tag 175. The battery may be replaceable and should not affect the transmitter and receiver. The power used by the tag 175 may be slightly less than that of a traditional key fob since the tag 175 does not need to function at as great of radius as a key fob. Additionally, only one button is necessary for tag pairing and testing.

The tag 175 may be tolerant of extreme temperature fluctuations, even more so than traditional key fobs 160 because tags may be secured to items left in a vehicle. In one example, a "BR" class coin battery may be used to achieve a temperature tolerance between −40 degrees Celsius and 85 degrees Celsius. The tag may also be tolerant of other environmental surroundings (e.g., tag may be waterproof.) The tag 175 may accept bands or clip pins to allow it to be attached to various surfaces such as fabric (e.g., diaper bags, backpacks, travel bags, sport equipment bags, etc.,) hard surfaces (e.g., suitcase, equipment cases, helmets, trailers, etc.,) curved surfaces (e.g., helmets, propane tanks, oxygen tanks, bicycles, etc.,) rough surfaces (e.g., coolers, skateboards, etc.,) fluid related items (e.g., life preservers, scuba tanks, fuel tanks, etc.).

The tag 175 may include a visible identification such as a number. The identification may be used by the interface to program the tags 175. For example, when associating a specific tag with an item, the interface may display the tag's number alongside an icon or photo of the item.

Figure 13A:
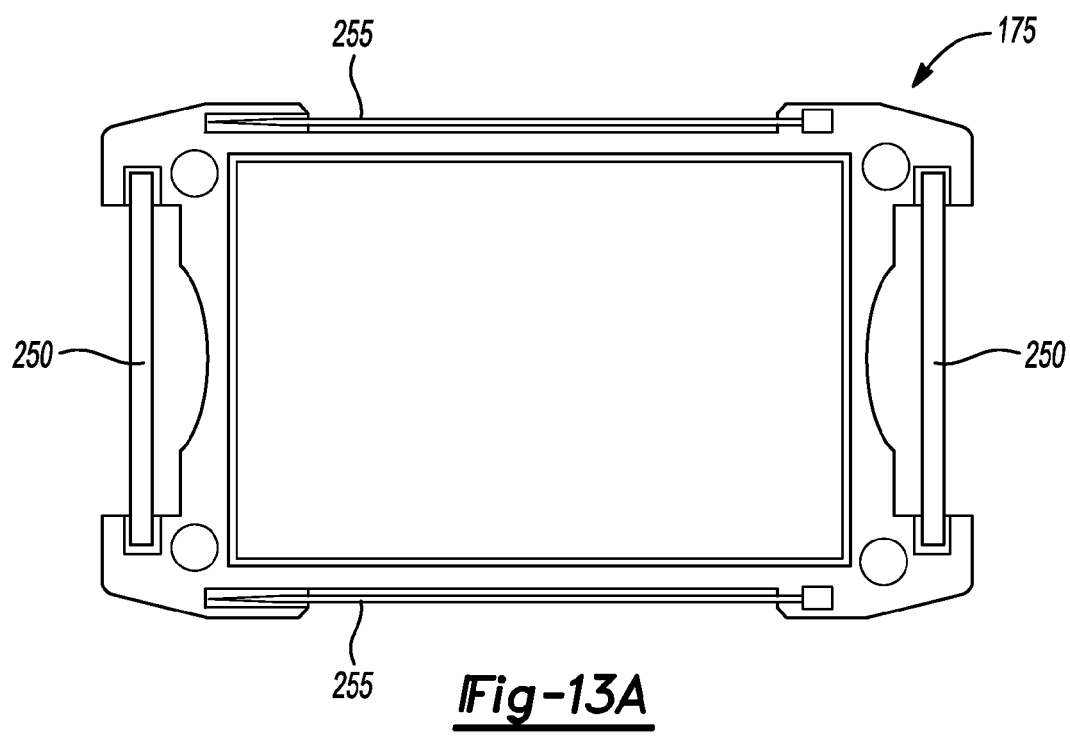
FIGS. 13A through 13B show additional tag configurations.
Figure 13B:
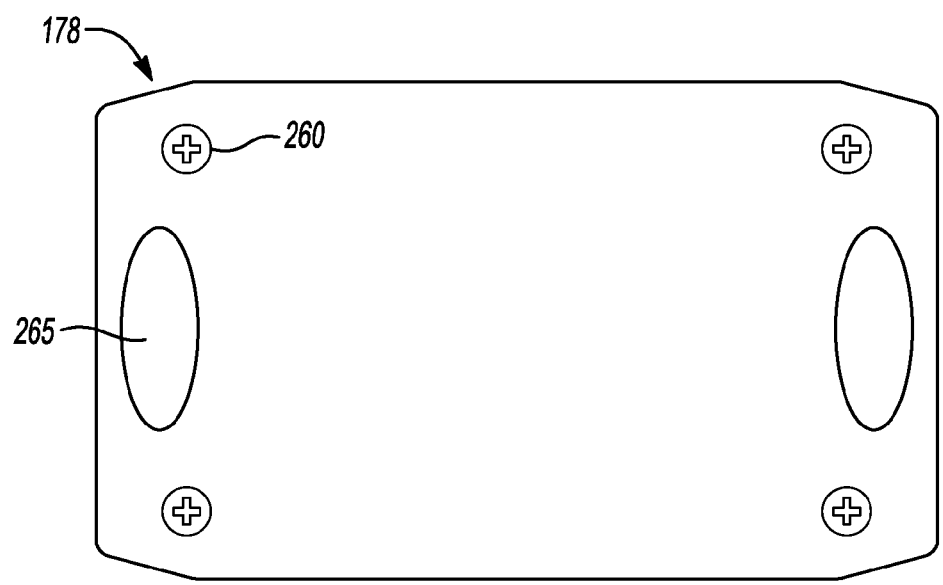

Each tag may include an attachment mechanism configured to attach the tag 175 to an item. The attachment mechanism may take on many forms as indicated in the exemplary tags 175. The attachment mechanism may include a key ring loop, safety pin type mechanism, tie strap, adhesive backing, wrist-watch type straps, bolt and screw mechanism, hiking clamp type mechanism, etc. FIG. 13A shows an exemplary tag 175 having a first attachment mechanism 250 and a second attachment mechanism 255. The first attachment mechanism may be a bar configured to hold a wrist watch-like strap for attaching the tag 175 around an item. It may also allow zip-ties, key rings, etc., to be used in attaching the tag to an item. The second attachment mechanism 255 may be a safety pin-type mechanism configured to attach the tag 175 to a fabric surface. FIG. 13B is another exemplary tag 175 having another attachment mechanism 260. A hole 265 may be defined so as to also allow straps, zip ties, etc., to be used for attachment. The attachment mechanism 260 may include a threaded hole to allow the tag 175 to be screwed to a surface. Each tag 175 may include multiple attachment mechanisms.

Accordingly, by using existing components of a PEPS system, the inventory system does not need to use an expensive broad spectrum high power tag search transmitter reader. Thus, the entry costs of the described system are much lower than systems that use such high power readers. Further, as described above, the system may be used both for commercial and non-commercial use and in any type of vehicle (e.g., sedan, cross-over, sport utility vehicle, pick-up truck, van, semi-truck, etc.). The proposed PEPS base tag system can concurrently meet the needs of a business and a family, thus giving a user dual functionality. In one example, business owner may track his or her tools used for their business. The same business owner could track personal items throughout the day such as his or her child's backpack.

The low frequency power levels used by the tags to communicate with the antennas are the same power levels used for PEPS and thus have been established safe for vehicle cabin use for adults and children. These power levels are also free from OEM equipment interference. Further, the system may be implemented with very low material costs. In one example, a system with eight (8) tags may be under one hundred (100) dollars for aftermarket implementation. This is, in part, based on the ability to implement the system use existing vehicle architecture pieces such as PEPS key fobs, antennas, receivers and displays. Further, most vehicles may be configured with the system on an aftermarket basis with the addition of instructions and additional RFID tags. In some situations additional antennas may need to be added (e.g., extra antenna for the cargo bed of a truck). Additionally, the tagged items, rules lists, users IDs and other personalization information may be stored in the server and database to allow customers to easily download the information from their old car to a new car when they change leases or purchase a new vehicle. Further, if a car rental agency has vehicles with such a system, users may be able to download their tracking lists and rules to track tagged items (they may be taken with them on vacation or a business trip) in their rental vehicle.

Further, an easy to use inventory system may allow for various inventory checks which may be initiated by any one of several events such as a driver specific event, location event and object event. These rules may ensure that important items are included in the vehicle while ensuring that potentially dangerous or forbidden items are excluded. The interface of the inventory system 100 may also permit several users to easily create rules and track items at locations separate from the vehicle. That is, driver A in vehicle A may be able to track and identify items in vehicle B. Further, driver B may be able to remotely edit the rule for driver A from his or her user device 115. The rules may be associated with a specific route between two locations or geofence zones.

Moreover, because the inventory system may be added on in the aftermarket using existing components, the signals used to detect tags within a vehicle may potentially interfere with existing vehicle systems. In order to mitigate any signal collisions, the inventory system may instruct the antenna to transmit and listen at certain intervals to avoid collisions. That is, the listening period for tag response may not overlap with the listening period for other high frequency responses such as key fob responses.

Computing devices, such as the controller 150, generally include computer-executable instructions, where the instructions may be executable by one or more computing devices such as those listed above. Computer-executable instructions may be compiled or interpreted from computer programs created using a variety of programming languages and/or technologies, including, without limitation, and either alone or in combination, Java™, C, C++, Visual Basic, Java Script, Perl, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which typically constitutes a main memory. Such instructions may be transmitted by one or more transmission media, including coaxial cables, copper wire and fiber optics, including the wires that comprise a system bus coupled to a processor of a computer. Common forms of computer-readable media include, for example, a floppy disk, a flexible disk, hard disk, magnetic tape, any other magnetic medium, a CD-ROM, DVD, any other optical medium, a RAM, a PROM, an EPROM, a FLASH-EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their broadest reasonable constructions and their ordinary meanings as understood by those knowledgeable in the technologies described herein unless an explicit indication to the contrary in made herein. In particular, the use of the words "first," "second," etc. may be interchangeable.

What is claimed is:

1. A vehicle inventory interface system comprising:
a passive entry system including at least one controller configured to authenticate a key fob in a vicinity of the vehicle and to cause an interface to
present a plurality of points of interest and driving routes defined there between,
present a rule icon associated with each driving route, and
present, in response to a selection of the rule icon, a list of items corresponding to the driving route associated with the selected icon, and at least one option block for modifying the list in response to user selections.

2. The interface system of claim 1, wherein presenting the at least one option block includes presenting at least one alert option associated with a violation of the list.

3. The interface system of claim 2, wherein the at least one alert option includes a list of selectable alert types.

4. The interface system of claim 1, wherein the list of items includes a list of excluded items.

5. The interface system of claim 4, wherein the at least one option block includes an alert option associated with each of an excluded item within the list of excluded items.

6. A vehicle inventory interface system comprising:
a passive entry system configured to cause an interface to
present a plurality of points of interest and driving routes defined there between,
present an inventory list icon for each route that upon selection, presents rules specific to the respective route, the rules including a list of items to be included in and excluded from a vehicle during the respective route and an alert associated with each item.

7. The inventory system of claim 6, wherein the interface is further configured to display an alert in response to one of the items to be excluded from the vehicle being present in the vehicle for the respective route.

8. The inventory system of claim 7, wherein the alert includes a textual representation of a violation of the respective rule.

9. The inventory system of claim 6, wherein the passive entry system is further configured to cause the interface to highlight a point of interest associated with a current location of the vehicle.

10. The inventory system of claim 6, wherein the passive entry system is further configured to cause the interface to highlight the current route of the vehicle.

11. The inventory system of claim 6, wherein the alert includes a selectable alert type associated with the respective item.

12. An interface system comprising:
a user interface arrangement configured to
present a plurality of points of interest and driving routes defined there between,
present a list icon associated with each of the routes, and
display, in response to a selection of the list icon, an inventory list associated with the respective route indicating whether items specified by the inventory list are present within the vehicle.

13. The interface system of claim 12, wherein the user interface arrangement is further configured to display a rule list including at least one option block for modifying the rule list in response to user selections, the rule list associated with the respective driving route.

14. The interface system of claim 12, wherein selection of each list icon for each route presents a rule list specific to the respective route and distinct from a rule list associated with other routes.

* * * * *